(12) United States Patent
Ishii et al.

(10) Patent No.: US 8,575,246 B2
(45) Date of Patent: Nov. 5, 2013

(54) FLAME-RETARDANT THERMOPLASTIC RESIN COMPOSITION AND MOLDED ARTICLE

(75) Inventors: Hiromitsu Ishii, Nagoya (JP); Kentaro Togawa, Nagoya (JP); Sadanori Kumazawa, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 234 days.

(21) Appl. No.: 13/145,678

(22) PCT Filed: Jul. 5, 2010

(86) PCT No.: PCT/JP2010/061368
§ 371 (c)(1),
(2), (4) Date: Jul. 21, 2011

(87) PCT Pub. No.: WO2011/007687
PCT Pub. Date: Jan. 20, 2011

(65) Prior Publication Data
US 2011/0275743 A1    Nov. 10, 2011

(30) Foreign Application Priority Data

Jul. 17, 2009  (JP) .................................. 2009-168416
Nov. 27, 2009  (JP) .................................. 2009-270060

(51) Int. Cl.
*C08K 5/34*    (2006.01)
*C07F 9/48*    (2006.01)

(52) U.S. Cl.
USPC .......................................... 524/106; 524/126

(58) Field of Classification Search
USPC ....................................................... 524/106
See application file for complete search history.

(56) References Cited

U.S. PATENT DOCUMENTS

2004/0227130 A1 * 11/2004 Hoerold et al. ............... 252/601
2009/0131565 A1 *  5/2009 Roth ............................ 524/100

FOREIGN PATENT DOCUMENTS

| JP | 08165353 | 6/1996 | |
|---|---|---|---|
| JP | 11060914 | 3/1999 | |
| JP | 2003183509 | 7/2003 | |
| JP | 2003183509 A * | 7/2003 | ............ C08L 101/00 |
| JP | 2004263188 | 9/2004 | |
| JP | 2006528991 | 12/2006 | |
| WO | 2007128678 | 11/2007 | |

OTHER PUBLICATIONS

Translation of JP2003-183509, Kaneko et al., Jul. 3, 2003.*
International Search Report for PCT/JP2010/061368 dated Aug. 3, 2010.

* cited by examiner

*Primary Examiner* — Hui Chin
(74) *Attorney, Agent, or Firm* — RatnerPrestia

(57) ABSTRACT

A flame-retardant thermoplastic resin composition that has a largely decreased corrosiveness to metals while maintaining a high degree of flame retardancy is provided, which is produced by adding a phosphinic acid salt and a compound having a specific structure to a thermoplastic resin, and molded articles with largely decreased corrosiveness to metals are also provided, so that useful molded articles can be provided as materials for mechanical machine parts, electric/electronic components, and automotive parts. The flame-retardant thermoplastic resin composition includes 65 to 99 wt % of (A) a thermoplastic resin, 1 to 35 wt % of (B) at least one phosphinic acid salt selected from the group of phosphinic acid salt, diphosphinic acid salt, polymer of phosphinic acid salts, and polymer of diphosphinic acid salts, and 0.001 to 0.70 wt % of (C) a compound having a specific, and molded articles produced therefrom.

8 Claims, No Drawings

FLAME-RETARDANT THERMOPLASTIC RESIN COMPOSITION AND MOLDED ARTICLE

CROSS-REFERENCE TO RELATED APPLICATIONS

This application is the U.S. National Phase application of PCT International Application No. PCT/JP2010/061368, filed Jul. 5, 2010, and claims priority of Japanese Patent Application No. 2009-168416, filed Jul. 17, 2009, and Japanese Patent Application No. 2009-270060, filed Nov. 27, 2009, the disclosures of each of these applications being incorporated herein by reference in their entirety for all purposes.

FIELD OF THE INVENTION

The invention relates to a flame-retardant thermoplastic resin composition, and particularly relates to a flame-retardant thermoplastic resin composition that comprises a thermoplastic resin containing a phosphinic acid salt and a compound of a specific structure and has a highly improved corrosion resistance to metals.

BACKGROUND OF THE INVENTION

With excellent characteristics including injection moldability and mechanical properties, polyester and polyamide resins have been used in a wide range of fields such as mechanical machine parts, electric/electronic components, and automotive parts. Being crystalline plastics with high melting points, polyester and polyamide resins require melt-kneading type extruders and injection molding machines with a high operating temperature.

Being essentially combustible, most polyester and polyamide resins should be modified to have features against fire, i.e. flame retardancy, in good balance with other common chemical and physical characteristics when used as material for mechanical machine parts, electric/electronic components, and automotive parts. In many cases, they have a high degree of flame retardancy to meet the V-0 requirements specified in UL 94.

As a means of making polyester and polyamide resins flame-retardant, a halogen-based organic compound and an antimony compound are generally added to the resin as flame retarder and flame retardation assistant, respectively. However, increasing numbers of environment-conscious people are worrying about the influence of halogen-based organic compounds on environment.

In recent years, there has been stronger call for the use of non-halogen type flame retarders completely free from halogens, and it has been proposed to add an appropriate phosphinic acid salt as flame retardant to a thermoplastic resin.

Patent documents 1 and 2, for instance, have disclosed the addition of a phosphinic acid salt and a nitrogen-containing compound, as non-halogen type flame retarders. However, if such a phosphinic acid salt is used as flame retarder to make polyester and polyamide resins flame-retardant, the flame retarder can generate a corrosive gas, which then acts to corrode the screws of kneading machines or the molds of injection molding machines.

It seems also likely that metal parts such as terminals that come in contact with molded articles produced from the resulting flame-retardant thermoplastic resin can be corroded to cause contact contamination.

Thus, the above problem cannot be solved by the techniques proposed in Patent documents 1 or 2, and development of effective solutions has been an essential issue. Accordingly, new techniques that can solve the above problem and meet present requirements in the fields of mechanical machine parts, electric/electronic components, and automotive parts have been strongly called for.

PATENT DOCUMENTS

Patent document 1: Japanese Unexamined Patent Publication (Kokai) No. HEI-11-60924 (Claims)
Patent document 2: Japanese Unexamined Patent Publication (Kokai) No. 2004-263188 (Claims)

SUMMARY OF THE INVENTION

The present invention aims to provide a flame-retardant thermoplastic resin composition that has a largely decreased corrosiveness to metals while maintaining a high degree of flame retardancy, and also aims to provide molded articles with largely decreased corrosiveness to metals, so that useful molded articles can be provided as materials for mechanical machine parts, electric/electronic components, and automotive parts.

The present inventors have carried out a range of studies to solve the problem and arrived at the invention after finding that the problem can be solved by adding specific amounts of "(B) a phosphinic acid salt", and "(C) a compound of a specific structure".

Specifically, the invention has the following features according to exemplary embodiments.

(1) A flame-retardant thermoplastic resin composition comprising 65 to 99 wt % of "(A) a thermoplastic resin", 1 to 35 wt % of "(B) at least one phosphinic acid salt selected from the group of phosphinic acid salt, diphosphinic acid salt, polymer of phosphinic acid salts, and polymer of diphosphinic acid salts", and 0.001 to 0.70 wt % of "(C) a compound having a structure as represented by Formula (1) given below".

(1)

(2) A flame-retardant thermoplastic resin composition as described in paragraph (1) wherein "(A) a thermoplastic resin" is at least one selected from the group of polyester resin, polyamide resin, and polycarbonate resin.

(3) A flame-retardant thermoplastic resin composition as described in either paragraph (1) or (2) wherein "(C) a compound" is a compound as represented by Formula (2) given below:

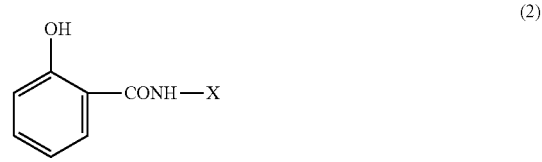

(2)

(Here, X represents a heterocyclic group containing a nitrogen atom.)

(4) A flame-retardant thermoplastic resin composition as described in either paragraph (1) or (2) wherein "(C) a compound" is a compound as represented by Formula (3) given below.

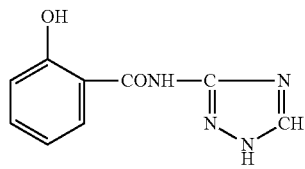

(3)

(5) A flame-retardant thermoplastic resin composition as described in any of paragraphs (1) to (4) and molded articles thereof that do not corrode metals when subjected to heat treatment at a heat treatment temperature of 270° C. for a heat treatment time of 3 hours.

(6) A flame-retardant thermoplastic resin composition as described in any of paragraphs (1) to (5) further containing 0.001 to 1.0 part by weight of "(D) an acidic phosphate compound" relative to 100 parts by weight of items (A), (B) and (C).

(7) A flame-retardant thermoplastic resin composition as described in any of paragraphs (1) to (6) further containing "(E) one or more phosphorus compounds selected from the group of phosphate compound, phosphazene compound, and phosphaphenanthrene compound" and/or "(F) a nitrogen compound based flame retarder", wherein the total of said "(E) one or more phosphorus compounds selected from the group of phosphate compound, phosphazene compound, and phosphaphenanthrene compound" and said "(F) a nitrogen compound based flame retarder" accounts for 1.0 to 25 parts by weight relative to 100 parts by weight accounted for by the total of said "(A) a thermoplastic resin", "(B) at least one phosphinic acid salt selected from the group of phosphinic acid salt, diphosphinic acid salt, polymer of phosphinic acid salts, and polymer of diphosphinic acid salts", and said "(C) a compound having a structure as represented by Formula (1)".

(8) Molded articles produced by molding a flame-retardant thermoplastic resin composition as described in any of paragraphs (1) to (7).

The flame-retardant thermoplastic resin composition of exemplary embodiments of the invention has a largely decreased corrosiveness to metals while maintaining a high degree of flame retardancy.

Molded articles produced from the flame-retardant thermoplastic resin composition of the invention can serve effectively to provide machine mechanism parts, electric/electronic components, and automotive parts.

DETAILED DESCRIPTION OF THE INVENTION

The invention is described in detail below with reference to exemplary embodiments. The invention provides a flame-retardant thermoplastic resin composition containing 65 to 99 wt % of "(A) a thermoplastic resin".

Usable resins as said "(A) a thermoplastic resin" include: aliphatic polyester resins such as polyolefin resin (low density polyethylene resin, high density polyethylene resin, polypropylene resin), polyester resin, polyamide resin, and polylactic acid; acrylic resins such as polystyrene resin, polyacetal resin, aromatic or aliphatic polyketone resin, polyphenylene sulfide resin, polyether ether ketone resin, polyimide resin, thermoplasticity starch resin, and polymethyl methacrylate resin; and others such as styrene based resin (polystyrene resin, acrylonitrile/styrene resin (AS resin), acrylonitrile/butadiene/styrene resin (ABS resin), acrylonitrile/ethylene/styrene resin (AES resin), acrylonitrile/acrylic/styrene resin (AAS resin), chlorinated polyethylene/acrylonitrile/styrene resin (ACS resin), polyvinyl chloride based resin, polyvinylidene chloride resin, vinyl ester based resin, methyl methacrylate/styrene (MS resin), polycarbonate resin, polyallylate resin, polysulfone resin, polyethersulfone resin, phenoxy resin, polyphenylene ether resin, poly-4-methyl pentene-1, polyetherimide resin, polyvinyl alcohol resin, and thermoplasticity elastomer (polyester elastomers such as polyether ester block copolymer and polyester ester block copolymer; polyamide elastomers such as polyether ester amide block copolymer and polyester amide block copolymer; and polyolefin based elastomers). Polymer alloy resins may also be used, and useful ones include, for instance, polymer alloy resins of polycarbonate resin and ABS resin; polymer alloy resins of polybutylene terephthalate resin, which is a polyester resin, and ABS resin; and polymer alloy resins of polyamide resin and ABS resin.

In particular, polyester resin, polyamide resin, and alloy resins thereof, are preferably used as said (A) a thermoplastic resin because of their high crystallinity.

The content of said "(A) a thermoplastic resin" is 65 to 99 wt %, preferably 70 to 95 wt %, and more preferably 75 to 90 wt %. Adequate moldability is achieved when it is 65 wt % or more, while good mechanical characteristics are obtained when it is 99 wt % or less.

The polyester resin as a preferable component of item (A) is preferably a polymer or a copolymer comprising, as main structural unit, one or more selected from the group of (a) dicarboxylic acid or ester-forming derivative thereof, and diol or ester-forming derivative thereof, (b) hydroxycarboxylic acid or ester-forming derivative thereof, and (c) lactone.

Examples of said dicarboxylic acid or ester-forming derivative thereof include aromatic dicarboxylic acids such as terephthalic acid, isophthalic acid, phthalic acid, 2,6-naphthalene dicarboxylic acid, 1,5-naphthalene dicarboxylic acid, bis(p-carboxyphenyl) methane, anthracene dicarboxylic acid, 4,4'-diphenyl ether dicarboxylic acid, 5-tetrabutyl phosphonium isophthalic acid, 5-sodium sulfoisophthalic acid; aliphatic dicarboxylic acids such as oxalic acid, succinic acid, adipic acid, sebacic acid, azelaic acid, dodecanedioic acid, malonic acid, glutaric acid, and dimer acid; alicyclic dicarboxylic acids such as 1,3-cyclohexanedicarboxylic acid, and 1,4-cyclohexanedicarboxylic acid; and ester-forming derivatives thereof.

Examples of said diol and ester-forming derivative thereof include aliphatic glycols with a carbon number of 2 to 20 such as ethylene glycol, propylene glycol, 1,4-butanediol, neopentyl glycol, 1,5-pentanediol, 1,6-hexanediol, decamethylene glycol, cyclohexanedimethanol, cyclohexanediol, and dimer diols; long chain glycols with a molecular weight of 200 to 100,000 such as polyethylene glycol, poly-1,3-propylene glycol, and polytetramethylene glycol; aromatic dioxy compounds such as 4,4'-dihydroxybiphenyl, hydroquinone, t-butyl hydroquinone, bisphenol A, bisphenol S, and bisphenol F; and ester-forming derivatives thereof.

Examples of said polymer or copolymer comprising, as structural units, dicarboxylic acid or ester-forming derivative thereof, and diol or ester-forming derivative thereof include aromatic polyester resins such as polyethylene terephthalate, polypropylene terephthalate, polybutylene terephthalate, polycyclohexane dimethylene terephthalate, polyhexylene terephthalate, polyethylene isophthalate, polypropylene isophthalate, polybutylene isophthalate, polycyclohexane dimethylene isophthalate, polyhexylene isophthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polybutylene terephthalate/decane dicarboxylate, polyethylene terephthalate/cyclohexane dimethylene terephthalate, polyethylene terephthalate/5-sodium sulfoisophthalate, polypropylene terephthalate/5-sodium sulfoisophthalate, polybutylene terephthalate/5-sodium sulfoisophthalate, polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/isophthalate/polytetramethylene glycol, polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene terephthalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate, and polybutylene terephthalate/isophthalate/sebacate; and aliphatic polyester resins such as polyethylene oxalate, polypropylene oxalate, polybutylene oxalate, polyethylene succinate, polypropylene succinate, polybutylene succinate, polyethylene adipate, polypropylene adipate, polybutylene adipate, polyneopentyl glycol adipate, polyethylene sebacate, polypropylene sebacate, polybutylene sebacate, polyethylene succinate/adipate, polypropylene succinate/adipate, and polybutylene succinate/adipate.

Examples of said hydroxycarboxylic acid include glycolic acid, lactic acid, hydroxypropionic acid, hydroxybutyric acid, hydroxyvaleric acid, hydroxycaproic acid, hydroxybenzoic acid, p-hydroxybenzoic acid, 6-hydroxy-2-naphthoic acid, and ester-forming derivatives thereof; and examples of said polymer or copolymer comprising these as structural units include aliphatic polyester resins such as polyglycolic acid, polylactic acid, polyglycolic acid/lactic acid, and polyhydroxybutyric acid/β-hydroxybutyric acid/β-hydroxyvaleric acid. If a polylactic acid is used, the polylactic acid may contain a stereocomplex structure composed of poly-L-lactic acid units and poly-D-lactic acid units.

Examples of said lactone include caprolactone, valerolactone, propiolactone, undeca lactone, and 1,5-oxepane-2-on, and examples of said polymer or copolymer comprising these as structural units include polycaprolactone, polyvalerolactone, polypropiolactone, and polycaprolactone/valerolactone.

Of these, preferable are polymers or copolymers comprising a dicarboxylic acid or a ester-forming derivative thereof and a diol or a ester-forming derivative thereof as main structural units, of which more preferable are polymers or copolymers comprising an aromatic dicarboxylic acid or a ester-forming derivative thereof and an aliphatic diol or a ester-forming derivative thereof as main structural units, and still more preferably are polymers or copolymers comprising terephthalic acid or a ester-forming derivative thereof and an aliphatic diol selected from the group of ethylene glycol, propylene glycol, and butanediol, or a ester-forming derivative thereof as main structural units. In particular, aromatic polyester resins such as polyethylene terephthalate, polypropylene terephthalate, polybutylene terephthalate, polycyclohexane dimethylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, and polybutylene terephthalate/polytetramethylene glycol are particularly preferable, and the use of one aromatic polyester resin selected from the group of polybutylene terephthalate, polyethylene terephthalate, polypropylene terephthalate, polyethylene naphthalate, polycyclohexane dimethylene terephthalate, and polybutylene terephthalate/polytetramethylene glycol is most preferable. It is also preferable to use a mixture of two or more aromatic polyester resins mixed at an appropriate ratio.

As examples of said combination of two or more aromatic polyester resins, the combinations of polybutylene terephthalate, polyethylene terephthalate, polypropylene terephthalate, or polyethylene naphthalate with polybutylene terephthalate/polytetramethylene glycol are preferable because of improved mechanical characteristics such as tensile elongation, and the combination of polybutylene terephthalate with polybutylene terephthalate/polytetramethylene glycol is particularly preferable because of high injection moldability. The combination of polybutylene terephthalate/polytetramethylene glycol is commercially available as Hytrel (registered trademark) from Du Pont-Toray Co., Ltd.

In these polymers or copolymers comprising a dicarboxylic acid or a ester-forming derivative thereof and a diol or a ester-forming derivative thereof as main structural units, terephthalic acid or an ester-forming derivative thereof preferably accounts for 30 mol % or more, more preferably 40 mol % or more, relative to the total quantity of dicarboxylic acid.

Said polyester resin may be a liquid crystalline polyester that can develop anisotropy as it is melted. Examples of the structural unit of such liquid crystalline polyester include aromatic oxycarbonyl unit, aromatic dioxy unit, aromatic and/or aliphatic dicarbonyl unit, alkylene dioxy unit, and aromatic imino-oxy unit.

The quantity of the carboxyl end group in the polyester resin is preferably 50 eq/t or less, more preferably 30 eq/t or less, still more preferably 20 eq/t or less, and particularly preferably 10 eq/t or less from the viewpoint of flowability, hydrolysis resistance and heat resistance. The lower limit is 0 eq/t.

The quantity of the carboxyl end group in the polyester resin is measured by dissolving the resin in an o-cresol/chloroform solvent and titrating it with ethanolic potassium hydroxide.

The quantity of the hydroxyl end group in the polyester resin is preferably 50 eq/t or more, more preferably 80 eq/t or more, still more preferably 100 eq/t or more, and particularly preferably 120 eq/t or more from the viewpoint of moldability and flowability. The upper limit is 180 eq/t.

The viscosity of the polyester resin is preferably such that its intrinsic viscosity in an o-chlorophenol solution measured at 25° C. is in the range of 0.36 to 1.60 dl/g, more preferably 0.50 to 1.50 dl/g, from the viewpoint of moldability.

The molecular weight of the polyester resin component of item (A) is preferably such that its weight average molecular weight (Mw) is in the range of more than 8,000 up to 500,000 or less, more preferably more than 8,000 up to 300,000 or less, and still more preferably more than 8,000 up to 250,000 or less, from the viewpoint of heat resistance. Mw of polyester resin is measured by gel permeation chromatography (GPC) using hexafluoroisopropanol as solvent and converted in terms of polymethyl methacrylate (PMMA).

Polyester resin may be produced by generally known condensation polymerization or ring opening polymerization, which may be carried out through either batch polymerization or continuous polymerization processes. The reaction may be carried out either through ester interchange or direct polymerization. Continuous polymerization is preferable because the quantity of the carboxyl end group can be decreased while improving both hydrolysis resistance and flowability, but direct polymerization is preferable in terms of costs.

If said polyester resin is a polymer or a copolymer that can be produced through condensation reaction mainly involving dicarboxylic acid or an ester-forming derivative thereof and a diol or an ester-forming derivative thereof, said polymer or copolymer may be produced by subjecting said dicarboxylic acid or an ester-forming derivative thereof and said diol or an ester-forming derivative thereof to esterification reaction or ester interchange reaction, followed by condensation polymerization reaction. To ensure effective progress of said esterification reaction or ester interchange reaction and condensation polymerization reaction, it is preferable to add a polymerization catalyst during these reactions. Examples of said polymerization catalyst include organic titanium compounds such as methyl ester, tetra-n-propyl ester, tetra-n-butyl ester, tetraisopropyl ester, tetraisobutyl ester, tetra-tert-butyl ester, cyclohexyl ester, phenyl ester, benzyl ester, and tolyl ester of titanium acid, and mixtures thereof; tin compounds such as dibutyltin oxide, methyl phenyltin oxide, tetraethyltin, hexaethyl ditin oxide, cyclohexahexyl ditin oxide, didodecyltin oxide, triethyltin hydroxide, triphenyltin hydroxide, triisobutyltin acetate, dibutyltin diacetate, diphenyltin dilaurate, monobutyltin trichloride, dibutyltin dichloride, tributyltin chloride, dibutyltin sulfide, and butyl butylhydroxytin oxide, as well as alkyl stannonic acids including methyl stannonic acid, ethyl stannonic acid, and butyl stannonic acid; zirconia compounds such as zirconium tetra-n-butoxide; and antimony compounds such as antimony trioxide, and antimony acetate. Of these, organic titanium compounds and tin compounds are preferable, and tetra-n-propyl ester, tetra-n-butyl ester and tetraisopropyl ester of titanium acid are more preferable. In particular, tetra-n-butyl ester of titanium acid is highly preferable. These polymerization catalysts may be used singly or as a mixture of two or more thereof. The content of these polymerization catalysts is preferably in the range of 0.005 to 0.5 parts by weight, more preferably 0.01 to 0.2 parts by weight, relative to 100 parts by weight of the polyester resin from the viewpoint of mechanical characteristics, moldability and color tone.

The polyamide resin as a preferable component of item (A) is a polyamide composed mainly of amino acid, lactam or diamine, together with dicarboxylic acid. Major examples of its constituents include amino acids such as 6-aminocaproic acid, 11-aminoundecanoic acid, 12-aminododecanoic acid, and para-aminomethyl benzoic acid; lactams such as ε-caprolactam and ω-laurolactam; aliphatic, alicyclic, or aromatic diamines such as pentamethylene diamine, hexamethylene diamine, 2-methyl pentamethylene diamine, nonamethylene diamine, undeca methylene diamine, dodeca methylene diamine, 2,2,4-/2,4,4-trimethyl hexamethylene diamine, 5-methyl nonamethylene diamine, meta-xylylene diamine, para-xylylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethyl piperazine; and aliphatic, alicyclic, or aromatic dicarboxylic acids such as adipic acid, suberic acid, azelaic acid, sebacic acid, dodecanedioic acid, terephthalic acid, isophthalic acid, 2-chloroterephthalic acid, 2-methyl terephthalic acid, 5-methyl isophthalic acid, 5-sodium sulfoisophthalic acid, 2,6-naphthalene dicarboxylic acid, hexahydro terephthalic acid, and hexahydroisophthalic acid. Nylon homopolymers and copolymers derived from the substances may also be used singly or in combination.

Polyamide resins with a high heat resistance and strength having a melting point of 150° C. or more are particular useful. Examples of such polyamide resins include polycaproamide (nylon 6), polyhexamethylene adipamide (nylon 66), polytetramethylene adipamide (nylon 46), polypentamethylene adipamide (nylon 56), polytetramethylene sebacamide (nylon 410), polypentamethylene sebacamide (nylon 510), polyhexamethylene sebacamide (nylon 610), polyhexamethylene dodecamide (nylon 612), polyundecane amide (nylon 11), polydodecane amide (nylon 12), polycaproamide/polyhexamethylene adipamide copolymer (nylon 6/66), polycaproamide/polyhexamethylene terephthalamide copolymer (nylon 6/6T), polyhexamethylene adipamide/polyhexamethylene terephthalamide copolymer (nylon 66/6T), polyhexamethylene adipamide/polyhexamethylene isophthalamide copolymer (nylon 66/ 6I), polyhexamethylene terephthalamide/polyhexamethylene isophthalamide copolymer (nylon 6T/6I), polyhexamethylene terephthalamide/polydodecane amide copolymer (nylon 6T/12), polyhexamethylene adipamide/polyhexamethylene terephthalamide/polyhexamethylene isophthalamide copolymer (nylon 66/6T/6I), polyxylylene adipamide (nylon XD6), polyhexamethylene terephthalamide/poly-2-methyl pentamethylene terephthalamide copolymer (nylon 6T/M5T), polynonamethylene terephthalamide (nylon 9T), and mixtures thereof.

In particular, preferable polyamide resins include nylon 6, nylon 66, nylon 12, nylon 610, nylon 6/66 copolymers, and nylon 6T/66 copolymer, nylon 6T/6I copolymer, nylon 6T/12, nylon 6T/6 copolymer, and other copolymers composed of hexamethylene terephthalamide units, and the use of these polyamide resins as a mixture to have required characteristics such as impact resistance and molding processability is also practical preferable.

The polymerization degree of these polyamide resins is preferably such that the relative viscosity of a 98% concentrated sulfuric acid solution with their content of 0.01 g/ml is in the range of 1.5 to 7.0, more preferably 2.0 to 6.0, as measured at 25° C.

It is preferable to add polycarbonate resin because it serves to produce flame-retardant thermoplastic resin composition with a high flame retardancy and machine physical properties. In particular, it is preferable to use polyester resin and polycarbonate resin in combination, and said polyester resin and polycarbonate resin preferably account for 50 to 99 wt % and 50 to 1 wt %, respectively, in the thermoplastic resin of item (A) because the tensile properties are improved largely. It is more preferable that said polyester resin and polycarbonate resin account for 60 to 90 wt % and 20 to 2 wt %, respectively, and still more preferably that said polyester resin and polycarbonate resin account for 70 to 80 wt % and 10 to 3 wt %, respectively. It is particularly preferable that said polyester resin and polycarbonate resin account for 70 to 80 wt % and 7 to 3 wt %, respectively.

The flame-retardant thermoplastic resin composition contains "(B) at least one phosphinic acid salt selected from the group of phosphinic acid salt, diphosphinic acid salt, polymer of phosphinic acid salts, and polymer of diphosphinic acid salts", at a content of 1 to 35 wt %.

A phosphinic acid salt is a compound represented by Formula (4) given below.

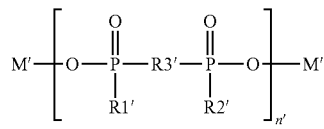

(4)

(In the formula, R1 and R2 are either identical to or different from each other and represent a hydrogen atom, or an alkyl or aryl group with a carbon number of 1 to 16. Their chains may be either linear or branched. M denotes calcium, aluminum or zinc, and n represents an integer of 1 to 4.)

A diphosphinic acid salt is a compound represented by Formula (5) given below.

(5)

$$M'\!\!-\!\!\left[\!O\!-\!\overset{\overset{O}{\|}}{\underset{R1'}{P}}\!-\!R3'\!-\!\overset{\overset{O}{\|}}{\underset{R2'}{P}}\!-\!O\!\right]_{n'}\!\!\!-\!\!M'$$

(In the formula, R1' and R2' are either identical to or different from each other, and represent a hydrogen atom, or an alkyl or aryl group with a carbon number of 1 to 16. Their chains may be either linear or branched. R3' denotes a linear or branched alkylene group with a carbon number of 1 to 10 or arylene, alkylarylene or arylalkylene group with a carbon number of 6 to 10. M' denotes calcium, aluminum or zinc, and n' represents an integer of 1 to 4.)

Examples of said phosphinic acid salt include polymers of said phosphinic acid salts and polymers of said diphosphinic acid salts. From the viewpoint of improving the mechanical properties, corrosiveness to metals, melt retention stability, flowability, and flame retardancy, the metal component is preferably aluminum, and said salt is preferably aluminum ethyl methylphosphinic acid salt or aluminum diethylphosphinic acid salt, of which aluminum diethylphosphinic acid salt is more preferable.

Commercial products of phosphinic acid salt include Exolit (registered trademark) OP1230 and OP1240 supplied by Clariant Japan K.K. Mixtures of a component of item (B), a nitrogen-containing compound and/or a boron-containing compound, such as OP1312 supplied by Clariant Japan K.K., are also available commercially and can be used preferably.

The content of "(B) at least one phosphinic acid salt selected from the group of phosphinic acid salt, diphosphinic acid salt, polymer of phosphinic acid salts, and polymer of diphosphinic acid salts", is preferably 1 to 35 wt %, more preferably 3 to 30 wt %, and still more preferably 5 to 25 wt %. Flame retardancy is maintained when it is 1 wt % or more, while good mechanical characteristics are maintained when it is 35 wt % or less.

The flame-retardant thermoplastic resin composition according to exemplary embodiments of the invention contains "(C) a compound having a structure as represented by Formula (1)" at 0.001 to 0.70 wt %.

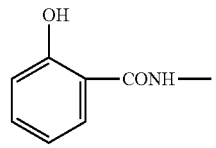

(1)

Item (C), i.e. a compound having a structure as represented by Formula (1), for the invention is preferably a compound as represented by Formula (2).

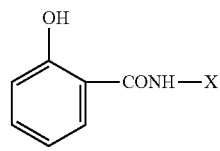

(2)

(Here, X represents a heterocyclic group containing a nitrogen atom.)

X may be any heterocyclic group if it contains a nitrogen atom, and the ring may contain one or more atoms selected from the group of carbon, oxygen, and sulfur, in addition to nitrogen. From the viewpoint of improving mechanical properties, corrosiveness to metals, melt retention stability, flowability, and flame retardancy, the number of atoms that constitute the ring is preferably 3 to 14, more preferably 5 to 7. Said ring may be a saturated ring, a partially unsaturated ring, or an aromatic ring group, and it may be either a monocyclic ring or a condensed ring. A monocyclic ring is preferable because of better mechanical properties, corrosiveness to metals, melt retention stability, flowability, and flame retardancy, and with respect to the ring structue, it is preferably 3- to 14-membered, more preferably 4- to 7-membered, still more preferably 5- to 6-membered, and most preferably 5-membered.

Specific examples of X include pyrrolyl group, imidazolyl group, benzimidazolyl group, imidazolidinyl group, pyrazolyl group, pyrazolidinyl group, triazolyl group, tetrazolyl group, oxa zolyl group, isooxa zolyl group, furazanyl group, thiazolyl group, isothiazolyl group, pyridyl group, pyridinyl group, pyridazinyl group, pyrimidinyl group, pyrazinyl group, pyrrolidinyl group, piperidinyl group, piperazinyl group, morpholinyl group, indolyl group, indolinyl group, isoindolyl group, isoindolinyl group, indolyzinyl group, Indazolyl group, quinolinyl group, isoquinolinyl group, quinolizinyl group, quinoxalinyl group, cinnolinyl group, phthalazinyl group, and carbazolyl group. Of these, pyrrolyl group, imidazolyl group, benzimidazolyl group, imidazolidinyl group, pyrazolyl group, pyrazolidinyl group, triazolyl group, and tetrazolyl group are more preferable, and triazolyl group is most preferable, from the viewpoint of better mechanical properties, corrosiveness to metals, and melt retention stability.

Specific examples of item (C) for the invention include compounds having a chemical structure as represented by Formulae (3) or (6) given below.

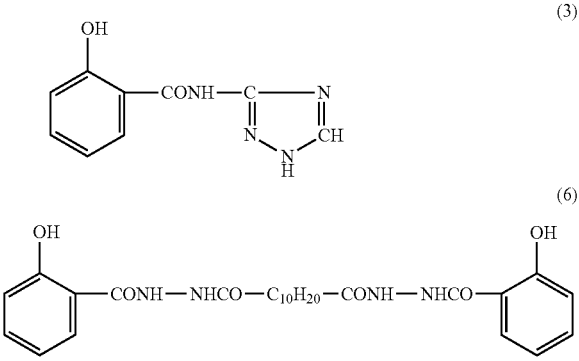

By adding "(C) a compound having a structure as represented by Formula (1) given above", the disadvantage of corrosiveness to metals of a flame-retardant thermoplastic resin composition containing "(B) a phosphinic acid salt", can be improved largely, and its melt retention stability can also be improved largely.

Commercial products of the compound represented by Formula (3) include CDA-1 supplied by Adeka Corporation. Adeka also provides CDA-1M which consists of a CDA-1 combined with an organic compound. Both can be used preferably. Commercial products of the compound represented by Formula (6) include CDA-6 supplied by Adeka Corporation.

The content of said "(C) a compound having a structure as represented by Formula (1) given above" is preferably 0.001 to 0.70 wt %, more preferably 0.01 to 0.50 wt %, and still more preferably 0.10 to 0.30 wt %. The corrosiveness to metals can be reduced largely when the content is 0.001 wt % or more, while a flame-retardant thermoplastic resin with a high mechanical strength and high flame retardancy can be obtained when the content is 0.70 wt % or less. The total of items (A) to (C) accounts for 100 wt %.

The addition of a compound of item (C) largely reduces the corrosiveness to metals. Said compound of item (C) may be reacted with compounds derived from a compound of item (A) or a compound of item (B) to form a flame-retardant thermoplastic resin composition, or said compound of item (C) may remain unreacted with compounds derived from a compound of item (A) or a compound of item (B) and maintain the initial structure retained at the time of blending the mixture. It is preferable, however, for said compound of item (C) to be reacted with compounds derived from a compound of item (A) or a compound of item (B) to thereby have highly improved effect.

The flame-retardant thermoplastic resin composition should be noncorrosive to metals during heat treatment at a heat treatment temperature of 150 to 350° C. for heat treatment time of 0.01 to 10 hours, preferably at a heat treatment temperature of 270° C. for heat treatment time of 3 hours. The expression "being noncorrosive to metals during heat treatment at a heat treatment temperature of 270° C. for heat treatment time of 3 hours" means that when an approximately 10 g of pellets or a molded article of a resin composition is put in a 60 mm-diameter glass petri dish with a glass lid, followed by covering the pellets or the molded article with a 25 mm-diameter watch glass, putting a 10 mm×20 mm, 1 mm-thick copper plate on the watch glass, closing the petri dish with said glass lid, leaving this specimen in a Geer oven, GPHH-200 supplied by Tabai Espec Corporation, at a controlled temperature of 270° C. for 3 hours, cooling the specimen down to room temperature, and visually observing the copper plate in the specimen to determine the degree of corrosion, the metal, i.e. copper, plate does not suffer corrosion. Actually, a corroded copper plate becomes aeruginous as it suffers verdigris, i.e. rust forming on copper, and therefore, a copper plate is considered corroded if it has become aeruginous. Such corrosion-free properties can be achieved by using the flame-retardant thermoplastic resin composition, namely by adding specific quantities of "(B) a phosphinic acid salt" and "(C) a compound of a specific structure".

The heat treatment temperature of 270° C. is within the kneading temperature range of common melt-kneading processes and within the molding temperature range of common injection molding processes for polyester and polyamide resins. If a material is found to corrode a metal specimen during heat treatment under conditions of this heat treatment temperature of 270° C. and heat treatment time of 3 hours, it is likely that the material can cause the kneading screws or injection molding die to suffer metallic corrosion. If a material is found to corrode a metal specimen during heat treatment under conditions of this heat treatment temperature of 270° C. and heat treatment time of 3 hours, therefore, it is likely that molded articles produced from the material can cause corrosion, contact contamination, or the like in metal parts such as terminals that come in contact with them.

The flame-retardant thermoplastic resin composition preferably contains an acidic phosphate compound of item (D). By adding an acidic phosphate compound of item (D), the flame-retardant thermoplastic resin composition is improved not only in mechanical characteristics but also in melt retention stability and gas generation reduction during heating.

Said acidic phosphate compound of item (D) is a compound having a structure as represented by Formula (7) given below. Thus, it generally refers to esterification products of alcohol and phosphoric acid, in which some hydrogen atoms in the phosphoric acid are substituted by groups such as alkyl and aryl, and therefore, it contains a hydroxyl group. Low molecular weight compounds are in the form of colorless liquid while high molecular weight ones are in the form of white wax-like or flake-like solid.

$$O=P(OR)_m(OH)_{3-m} \qquad (7)$$

(In the formula, R represents an alkyl group with a carbon number of 1 to 30, and m denotes an integer of 1 or 2.)

The phosphate compound contained in item (E) as described later is in the form of a phosphoric acid in which some hydrogen atoms are substituted by groups such as alkyl and aryl, and therefore, the compound does not contain hydroxyl groups. Accordingly, its chemical structure is different from that of item (D), and it is used for different purposes from those of item (D).

The undermentioned phosphite-based antioxidant preferably used as stabilizer to improve thermal aging resistance is in the form of a phosphorous acid in which some hydrogen atoms are substituted by groups such as alkyl and aryl, and therefore, the compound does not contain hydroxyl groups. Accordingly, its chemical structure is different from that of item (D), and it is used for different purposes from those of item (D).

Specific examples of said acidic phosphate compound of item (D) include monomethyl acid phosphate, monoethyl acid phosphate, monoisopropyl acid phosphate, monobutyl acid phosphate, monolauryl acid phosphate, monostearyl acid phosphate, monododecyl acid phosphate, monobehenyl acid phosphate, dimethyl acid phosphate, diethyl acid phosphate, diisopropyl acid phosphate, dibutyl acid phosphate, lauryl acid phosphate, distearyl acid phosphate, didodecyl acid phosphate, dibehenyl acid phosphate, trimethyl acid phosphate, triethyl acid phosphate, mixtures of mono- and di-forms thereof, mixtures of mono-, di- and tri-forms thereof, mixtures of more than one thereof. Particularly preferable acidic phosphate compounds include long-chain alkyl acid phosphate compounds such as mixture of mono- and di-stearyl acid phosphate. Commercial examples include, for instance, Adeka Stab AX-71 supplied by Adeka Corporation, which is in the form of flake-like solid having a melting point.

The content of said acidic phosphate compound of item (D) is preferably 0.01 to 1.0 part by weight, more preferably 0.03 to 0.8 part by weight, and still more preferably 0.05 to 0.5 part by weight, relative to 100 parts by weight of items (A), (B) and (C). When it is 0.01 parts by weight or more, the mechanical characteristics are improved adequately, and in addition, an increase in the melt retention stability and a decrease in the gas generation rate during heating are also achieved. Good mechanical characteristics can be maintained when it is 1.0 part by weight or less.

The flame-retardant thermoplastic resin composition preferably contains:

(A) a thermoplastic resin, (B) at least one phosphinic acid salt selected from the group of phosphinic acid salt, diphosphinic acid salt, polymer of phosphinic acid salts, and polymer of diphosphinic acid salts, and (C) a compound having a structure as represented by Formula (1), and in addition, (E) one or more phosphorus compounds selected from the group of phosphate compound, phosphazene compound, and phosphaphenanthrene compound, and/or (F) a nitrogen compound based flame retarder.

Said "(E) one or more phosphorus compounds selected from the group of phosphate compound, phosphazene compound, and phosphaphenanthrene compound" can largely increase the flame retardancy if added in small amounts, and are used as flame retardation assistant.

Examples of said phosphate compound include triphenyl phosphate, tris-(dimethyl phenyl) phosphate, trixylenyl phosphate, tricresyl phosphate, cresyl diphenyl phosphate, cresyl dixylenyl phosphate, trimethyl phosphate, triethyl phosphate, condensed phosphate, and phosphoric ester amide. In particular, condensed phosphate is used preferably because of its heat resistance. Examples of said condensed phosphate include resorcinol diphenyl phosphate, hydroquinone diphenyl phosphate, bisphenol A diphenyl phosphate, and biphenyl diphenyl phosphate, and commercial products include PX-202, CR-741, PX-200, and PX-201 supplied by Daihachi Chemical Industry Co., Ltd., and FP-500, FP-600, FP-700 and PFR supplied by Adeka Corporation, which may be used singly or in combination.

Said phosphoric ester amide is a nitrogen-containing aromatic phosphoric ester amide, which is powdery at room temperature and has a high melting point and a high handleability in blending operations. Preferable commercial products include SP-703 supplied by Shikoku Chemicals Corporation.

Said phosphazene compound is a linear and/or cyclic phosphonitrile polymer, and in particular, a linear one mainly comprising phenoxy phosphazene is used preferably. Said linear and/or cyclic phosphonitrile polymer can be synthesized by generally known methods as described in "Hosufazen Kagobutsu No Gosei To Oyo (Synthesis and Application of Phosphazene Compounds)" written by Meisetsu Kajiwara. Thus, for instance, it can be synthesized by reacting either phosphorus pentachloride or phosphorus trichloride used as phosphorus source with either ammonium chloride or ammonia gas used as nitrogen source by an appropriate generally known method (or by purifying cyclic material), and subjecting the resulting substance to reaction for substitution by alcohol, phenol or amine. Preferable commercial products include Rabitle (registered trademark) FP-110 supplied by Fushimi Pharmaceutical Co., Ltd.

Said phosphaphenanthrene compound is a phosphorus-based flame retarder having at least one phosphaphenanthrene backbone in its molecule. Preferable commercial products include HCA, HCA-HQ, BCA, SANKO-220 and M-Ester supplied by Sanko Co., Ltd.

Said "(E) one or more phosphorus compounds selected from the group of phosphate compound, phosphazene compound, and phosphaphenanthrene compound" is preferably a phosphate compound selected from the group of triphenyl phosphate, trixylenyl phosphate, tricresyl phosphate, and condensed phosphate, because they serve to produce a flame-retardant thermoplastic resin composition with good mechanical characteristics and high retention stability.

Said "(F) a nitrogen compound based flame retarder" is one or more nitrogen compound based flame retarders selected from the group of aliphatic amine compound, aromatic amine compound, nitrogen-containing heterocyclic compound, cyanogen compound, aliphatic or aromatic amide, urea, and thiourea, of which nitrogen-containing heterocyclic compound is used preferably.

Examples of said aliphatic amine include ethyl amine, butyl amine, diethyl amine, ethylene diamine, butylene diamine, triethylene tetramine, 1,2-diaminocyclohexane, and 1,2-diaminocyclooctane.

Examples of said aromatic amine include aniline and phenylene diamine.

Examples of said nitrogen-containing heterocyclic compound include uric acid, adenine, guanine, 2,6-diaminopurine, 2,4,6-triaminopyridine, and triazine compounds.

Examples of said cyanogen compound include dicyandiamide.

Examples of said aliphatic or aromatic amide include N,N-dimethyl acetamide and N,N-diphenyl acetamide.

Said triazine compound given above as an example of said nitrogen-containing heterocyclic compound is a nitrogen-containing heterocyclic compound having a triazine backbone, and its examples include triazine, melamine, guanamine, methyl guanamine, cyabenzonuric acid, melamine cyanurate, melamine isocyanurate, trimethyl triazine, triphenyl triazine, amerine, ameride, thiocyanuric acid, diaminomercaptotriazine, diaminomethyl triazine, diaminophenyl triazine, diaminoisopropoxy triazine, and melamine polyphosphate, of which melamine cyanurate, melamine isocyanurate, and melamine polyphosphate are particularly preferable.

Preferable examples of said melamine cyanurate or melamine isocyanurate include addition products of either cyanuric acid or isocyanuric acid and a triazine compound normally in a ratio of 1:1 or 1:2 (molar ratio). Generally known methods may be used, for instance, to mix melamine with either cyanuric acid or isocyanuric acid to prepare a water slurry mixture, stirring the mixture adequately to produce their salt in the form of fine particles, followed by filtering and drying to provide the final product normally in the form of powder. The salt may not be entirely pure, but may contain a small amount of unreacted melamine and residual cyanuric acid or isocyanuric acid. If a sufficiently high dispersibility is not achieved, a dispersing agent such as tris-(β-hydroxyethyl) isocyanurate or a generally known surface treatment agent such as polyvinyl alcohol and silica or other metal oxides may be used in combination. Their average particle diameters before and after being added to said resin of melamine cyanurate or melamine isocyanurate is preferably 0.1 to 100 μm, more preferably 0.2 to 50 μm, and still more preferably 0.3 to 10 μm, to provide molded articles with a high flame retardancy, high mechanical strength, and good surface properties. The average particle diameter as referred to here is the average diameter particles with 50% cumulative distribution measured by the laser micron sizer method, and preferable commercial products include MC-4000 and MC-6000 supplied by Nissan Chemical Industries, Ltd.

Examples of said melamine polyphosphate include melamine phosphate, pyromelamine phosphate, and other melamine polyphosphates produced from melamine, melam, or melem. They may be used singly or in combination, and preferable commercial products include MPP-A supplied by Sanwa Chemical Co., Ltd., and PMP-100 and PMP-200 supplied by Nissan Chemical Industries, Ltd.

The total content of "(E) one or more phosphorus compounds selected from the group of phosphate compound, phosphazene compound, and phosphaphenanthrene compound", and/or "(F) a nitrogen compound based flame retarder" is preferably such that the total amount of "(E) one or more phosphorus compounds selected from the group of phosphate compound, phosphazene compound, and phosphaphenanthrene compound" and "(F) a nitrogen compound based flame retarder" accounts for 1.0 to 25 parts by weight, more preferably 2 to 20 parts by weight, still more preferably 3 to 15 parts by weight, and particularly preferably 3 to 7 parts by weight, relative to 100 parts by weight of items (A), (B) and (C). A sufficient flame retardation assisting effect is achieved when it is 1 part by weight or more, while good mechanical characteristics are maintained when it is 25 parts by weight or less.

A polyfunctional compound with three or more functional groups, preferably a polyhydric alcohol compound containing one or more alkylene oxide units each having three or more functional groups, may be added with the aim of improving the flowability during the molding process such as injection molding. Said polyhydric alcohol compound containing one or more alkylene oxide units each having three or more functional groups, may be either a low molecule compound or a polymer, and may be any polyhydric alcohol compound if it contains one or more alkylene oxide units each having three or more functional groups, such as trifunctional, tetrafunctional, or pentafunctional compounds. More preferably, the functional groups of said three or more functional groups are identical to or different from each other and it is preferable that each of them is one selected from the group of hydroxyl group, aldehyde group, carboxylic acid group, sulfo group, amino group, glycidyl group, isocyanate group, carbodiimide group, oxazoline group, oxazine group, ester group, amide group, silanol group, and silyl ether group, and in particular, it is more preferable that they are identical from the viewpoint of flowability, mechanical properties, durability, heat resistance and productivity.

Preferable and effective examples of the alkylene oxide unit in said polyhydric alcohol compound containing one or more alkylene oxide units each having three or more functional groups include aliphatic alkylene oxide units containing 1 to 4 carbon atoms. Specifically, they may be methylene oxide unit, ethylene oxide unit, trimethylene oxide unit, propylene oxide unit, tetramethylene oxide unit, 1,2-butylene oxide unit, 2,3-butylene oxide unit or isobutylene oxide unit. It is preferable to use compounds containing an ethylene oxide unit or propylene oxide unit as said alkylene oxide unit particularly from the viewpoint of flowability, recyclability, durability, heat resistance and mechanical properties, and it is particularly preferable to use compounds containing an propylene oxide unit from the viewpoint of high hydrolysis resistance and ductility (tensile elongation at break). With respect to the number of the alkylene oxide units, it is preferable that 0.1 to 20, more preferably 0.5 to 10, and still more preferably 1 to 5 alkylene oxide units are contained per functional group from the viewpoint of better flowability and mechanical properties.

Said polyhydric alcohol compound containing one or more alkylene oxide units each having three or more functional groups can have particularly significant effect when the thermoplastic resin of item (A) is polyester resin. It may constitute part of the backbone chain or side chain of item (A) after reacting with the polyester resin, or may not react with item (A) and maintain its initial structure retained at the time of blending.

Said polyhydric alcohol compound containing one or more alkylene oxide units each having three or more functional groups preferably has a viscosity of 15,000 m·Pa or less at 25° C. from the viewpoint of flowability, more preferably 5,000 m·Pa or less from the viewpoint of flowability and mechanical properties, and particularly preferably 2,000 m·Pa or less. There is no particular lower limit, but it is preferably 100 m·Pa or more from the viewpoint of bleeding during the molding process.

Said polyhydric alcohol compound containing one or more alkylene oxide units each having three or more functional groups preferably has a molecular weight or weight average molecular weight (Mw) preferably in the range of 50 to 10,000, more preferably in the range of 150 to 8,000, and still more preferably in the range of 200 to 6,000, from the viewpoint of flowability, as measured by gel permeation chromatography (GPC) using hexafluoroisopropanol as solvent and converted in terms of polymethyl methacrylate (PMMA).

Said polyhydric alcohol compound containing one or more alkylene oxide units each having three or more functional groups preferably has a moisture content of 1% or less. The moisture content is more preferably 0.5% or less, and still more preferably 0.1% or less. There is no lower limit to the moisture content. A moisture content of higher than 1% is not preferable because the mechanical properties would deteriorate.

Said polyhydric alcohol compound containing one or more alkylene oxide units each having three or more functional groups preferably accounts for 0.01 to 2.0 parts by weight, more preferably 0.05 to 1.5 parts by weight, and still more preferably 0.1 to 1.0 part by weight, relative to 100 parts by weight if items (A), (B) and (C). The flowability is improved when it is 0.01 part by weight or more, while good mechanical characteristics are maintained when it is 2.0 parts by weight or less.

Vinyl resin can be added preferably. The addition of said vinyl resin aims to improve electric characteristics such as tracking resistance, arc resistance and dielectric strength, and increase the ductility characteristics such as impact strength.

Examples of said vinyl resin include resins produced by polymerizing one or more monomers selected from the group of aromatic vinyl compound, vinyl cyanide compound, alkyl (meth)acrylate, and maleimide-based monomers; and resins produced by graft-polymerizing or copolymerizing these monomers with a rubber-type component such as polybutadiene rubber. Said one or more monomers selected from the group of aromatic vinyl compound, vinyl cyanide compound, alkyl(meth)acrylate, and maleimide-based monomers accounts for 50 wt % or more of the graft-polymerized or copolymerized vinyl resin (hereinafter these may be simply referred as (co)polymers).

Examples of said aromatic vinyl compound include styrene, α-methyl styrene, vinyl toluene, and divinylbenzene. Examples of said vinyl cyanide compound include acrylonitrile, and methacrylonitrile. Examples of said alkyl(meth)acrylate include methyl methacrylate, ethyl methacrylate, n-butyl methacrylate, methyl acrylate, ethyl acrylate, n-butyl acrylate, and stearyl acrylate. Examples of said maleimide monomer include N-substitute maleimides such as maleimide, N-methyl maleimide, N-ethyl maleimide, N-phenyl maleimide, N-cyclohexyl maleimide, and derivatives thereof. Vinyl resin produced from the following components that can be copolymerized with said vinyl resin can also be used. Specifically, such copolymerizable components include diene compound, dialkyl maleate, allyl alkyl ether, unsaturated amino compound, and vinyl alkyl ether.

Examples of said preferable (co)polymers of vinyl resin include vinyl (co)polymers such as polymethyl methacrylate, methyl methacrylate/acrylonitrile, polystyrene resin, acrylonitrile/styrene resin (AS resin), styrene/butadiene resin, styrene/N-phenyl maleimide resin, and styrene/acrylonitrile/N-phenyl maleimide resin; styrene resins modified with rubber-like polymer such as acrylonitrile/butadiene/styrene resin (ABS resin), acrylonitrile/butadiene/methyl methacrylate/styrene resin (MABS resin), and high impact polystyrene resin; and block copolymers such as styrene/butadiene/styrene resin, styrene/isoprene/styrene resin, and styrene/ethylene/butadiene/styrene resin. In particular, polystyrene resin and acrylonitrile/styrene resin are preferable, and acrylonitrile/styrene copolymer, which is a copolymer produced by copolymerizing acrylonitrile and styrene, is more preferable ("/" divides components of copolymer).

It is particularly preferable that said acrylonitrile/styrene resin is acrylonitrile/styrene resin in which acrylonitrile accounts for 15 wt % or more and less than 35 wt %.

Said vinyl resin may be graft-polymerized or copolymerized with unsaturated monocarboxylic acid, unsaturated dicarboxylic acid, unsaturated anhydride, or epoxy-containing vinyl monomer. In particular, it is preferable that said vinyl resin is graft-polymerized or copolymerized with unsaturated anhydride or epoxy-containing vinyl monomer.

Said unsaturated anhydride is a compound containing both a radical-polymerizable vinyl group and an anhydride in one molecule, and specifically, preferable examples include maleic anhydride.

Said epoxy-containing vinyl monomer is a compound containing both a radical-polymerizable vinyl group and an epoxy group in one molecule, and its examples include glycidyl esters of unsaturated organic acid such as glycidyl acrylate, glycidyl methacrylate, glycidyl ethacrylate, and itaconate glycidyl; glycidyl ethers such as allyl glycidyl ether; and derivatives thereof such as 2-methyl glycidyl methacrylate, of which glycidyl acrylate and glycidyl methacrylate are preferable. These may be used singly or in combination.

When a unsaturated monocarboxylic acid, unsaturated dicarboxylic acid, unsaturated anhydride or epoxy-containing vinyl monomer is used for graft polymerization or copolymerization, it preferably accounts for 0.05 wt % or more of the vinyl resin. If they are used for copolymerization in a large amount, a decrease in flowability and gelation tend to take place, and their content is preferably 20 wt % or less, more preferably 10 wt % or less, and still more preferably 5 wt % or less.

Said vinyl resin may be epoxy-modified with an epoxidizing agent such as peroxide, performic acid, peracetic acid, and perbenzoic acid. In this case, said vinyl resin may be random-copolymerized or block-copolymerized with a diene monomer to allow effective epoxy modification. Preferable examples of said diene monomer include butadiene and isoprene. Preferable production methods for these epoxy-modified vinyl resins are described in, for instance, Japanese Unexamined Patent Publication (Kokai) No. HEI-6-256417, and Japanese Unexamined Patent Publication (Kokai) No. HEI-6-220124.

Said vinyl resin may also preferably have a multi-layered structure. Said multi-layered structure consists of an innermost layer (core layer) and one or more outer layers (shell layers) that cover the former. Thus, said vinyl resin is preferably a polymer having a so-called core-shell structure in which said vinyl resin constitutes one of the outer layers (shell layers) with neighboring layers being of different polymers.

There are no specific limitations on the number of layers that constitute said multi-layered structure, as long as two or more layers are contained.

Said multi-layered structure preferably contains one or more rubber layers.

There are no specific limitations on the type of rubber layer used for said multi-layered structure as long as the rubber layer is made of a polymer component with rubber elasticity. For instance, said rubber may be of a polymer constituted of acrylic component, silicone component, styrene component, nitrile component, conjugated diene component, urethane component or ethylene propylene component. Preferably, said rubber is made of a polymer of, for instance, acrylic components such as ethyl acrylate unit and butyl acrylate unit; silicone components such as dimethyl siloxane unit and phenyl methyl siloxane unit; styrene components such as styrene unit and a-methyl styrene unit; nitrile components such as acrylonitrile unit and methacrylonitrile unit; and conjugated diene components such as butane diene unit and isoprene unit. Rubbers produced by copolymerizing two or more of these components are also used preferably.

The vinyl resin to be used as the outer layers (shell layers) may be graft-polymerized or copolymerized with an unsaturated monocarboxylic acid, unsaturated dicarboxylic acid, unsaturated anhydride, or epoxy-containing vinyl monomer, and may be epoxy-modified with an epoxidizing agent such as peroxide, performic acid, peracetic acid, and perbenzoic acid.

Preferable examples of said multi-layered structure include a structure consisting of a core layer of dimethyl siloxane/butyl acrylate polymer with an outermost layer of methyl methacrylate polymer or acrylonitrile/styrene copolymer; a structure consisting of a core layer of butane diene/styrene polymer with an outermost layer of methyl methacrylate polymer or acrylonitrile/styrene copolymer; and a structure consisting of a core layer of butyl acrylate polymer with an outermost layer of methyl methacrylate polymer or acrylonitrile/styrene copolymer. Furthermore, it is more preferable that either the rubber layer or outermost layer, or both of them, are of a polymer containing a glycidyl methacrylate unit.

There are no specific limitations on the weight ratio between the core and the shell in said multi-layered structure, but it is preferable that the core layer accounts for 10 wt % or more and 90 wt % or less, more preferably 30 wt % or more and 80 wt % or less, of the total weight of the polymer in the multi-layered structure.

Said multi-layered structure may be a commercial product that meets the requirements described above, and may be produced by a generally known method. Commercial products of said multi-layered structure include, for instance, Metabrane supplied by Mitsubishi Rayon Co., Ltd., Kane Ace supplied by Kaneka Corporation, Paraloid supplied by Rohm and Haas Company, Stafiloid supplied by Ganz Chemical Co., Ltd., and Paraface supplied by Kuraray Co., Ltd., which may be used singly or in combination.

Said vinyl resin may contain a vinyl polymer as branched chain of a graft copolymer. Examples of the polymer that constitutes the backbone chain include polyolefin, acrylic resin, and polycarbonate resin. Either the branched chain or the backbone chain may be modified with glycidyl methacrylate or acid anhydride. Specific examples include poly(ethylene/glycidyl methacrylate)-g-polymethyl methacrylate (E/GMA-g-PMMA), poly(ethylene/glycidyl methacrylate)-g-polystyrene (E/GMA-g-PS), poly(ethylene/glycidyl methacrylate)-g-acrylonitrile/styrene (E/GMA-g-AS), poly(ethylene-g-acrylonitrile/styrene (E-g-AS), polycarbonate-g-acrylonitrile/styrene (PC-g-AS) ("-g-" and "-/-" indicate graft polymerization and copolymerization, respectively.)

Commercial products of said material include, for instance, Modiper supplied by NOF Corporation, and they may be used singly or as a mixture with other vinyl resins.

Said vinyl resin preferably accounts for 0.1 to 10 parts by weight, more preferably 0.5 to 8 parts by weight, and still more preferably 1 to 6 parts by weight, relative to 100 parts by weight of items (A), (B) and (C). Electric characteristics and ductility are improved when the content is 0.1 parts by weight or more, while good mechanical characteristics are achieved when it is 10 parts by weight or less.

Generally known flame retarders such as silicone-based flame retarder, phenol resin, and inorganic flame retarder may be added as long as they do not impair the effect of the invention.

Examples of said silicone-based flame retarder include silicone resin and silicone oil. Examples of said silicone resin include a resin having a three dimensional network structure consisting of a combination of structural units such as $SiO_2$, $RSiO_{3/2}$, $R_2SiO$, and $R_3Si_{1/2}$. Here, R represents an alkyl group, methyl group, ethyl group, and propyl group; an aromatic group such as phenyl group and benzyl group; or a group of said substituent group containing a vinyl group. Examples of said silicone oil include polydimethyl siloxane and modified polysiloxane in which at least one methyl group in the side chain or the end is modified with at least one of the following: hydrogen atom, alkyl group, cyclohexyl group, phenyl group, benzyl group, amino group, epoxy group, polyether group, carboxyl group, mercaptogroup, chloroalkyl group, alkyl higher alcohol ester group, alcohol group, aralkyl group, vinyl group, trifluoromethyl group, and mixtures thereof.

Said phenol resin is a resin having two or more phenolic hydroxyl groups and may be, for instance, a novolac, resol, or heat-reactive resin or a modified resin thereof. They may be in the form of uncured resun containing no curing agents, semicured resin, or cured resin. In particular, novolac phenol resin and melamine-modified novolac phenol resin that are free from curing agents and non-heat-reactive are preferable from the viewpoint of high flame retardancy, tensile strength, and weld strength.

Said phenol resin may be in the form of crushed pieces, particles, flakes, powder, needles, or liquid, of which one or more may be used as required. There are no specific limitations on the type of phenolic resin, and commercial products may be used. To produce a novolac phenol resin, for instance, a phenol and an aldehyde are fed to a reaction vessel at a ratio of 1:0.7 to 1:0.9, and catalysts such as oxalic acid, hydrochloric acid, sulfuric acid, and toluenesulfonic acid are added, followed by heating for a predetermined time for reflux reaction. Then, vacuum dehydration or ventilation drying is performed to remove the resultng water, and residual water and unreacted phenol are further removed to provide the intended resin. Resins produced by this procedure and co-condensed phenol resins produced from two or more materials may be used singly or in combination.

To produce a resol phenol resin, a phenol and an aldehyde is fed to a reaction vessel at a ratio of 1:1 to 1:2, and catalysts such as sodium hydroxide, aqueous ammonia, and other basic substances are added, followed by carrying out the same reaction and processing procedure as for novolac phenol resin.

Examples of said phenol include phenol, o-cresol, m-cresol, p-cresol, thymol, p-tert-butyl phenol, tert-butyl catechol, catechol, isoeugenol, o-methoxy phenol, 4,4'-dihydroxyphenyl-2,2-propane, isoamyl salicylate, benzyl salicylate, methyl salicylate, and 2,6-di-tert-butyl-p-cresol. These phenol-based substances may be used singly or in combination. Examples of said aldehyde, on the other hand, include formaldehyde, para-formaldehyde, polyoxy methylene, and trioxane. These aldehyde-based substances may be used singly or in combinationas required.

There are no specific limitations on the molecular weight of said phenol resin, but the number average molecular weight is preferably 200 to 2,000, and particularly preferably 400 to 1,500 from the viewpoint of mechanical properties, flowability, and economic efficiency. The molecular weight of phenol resin can be determined by gel permeation chromatography using a tetrahydrofuran solution and a polystyrene standard sample. Said silicone-based flame retarder and phenol resin can protect the surface of a molded article from flames as the silicone-based flame retarder and phenol resin move to the surface of the molded article when exposed to combustion heat. Their blending quantity preferably accounts for 0.05 to 2.0 parts by weight, more preferably 0.1 to 1.5 parts by weight, and still more preferably 0.15 to 1.0 parts by weight, relative to 100 parts by weight of items (A), (B) and (C). A high flame retardancy is achieved when it is 0.05 parts by weight or more, while good mechanical characteristics are maintained when it is 2.0 parts by weight or less.

Examples of said inorganic flame retarder include magnesium hydroxide hydrate, aluminum hydroxide hydrate, antimony trioxide, antimony pentoxide, sodium antimonate, zinc hydroxystannate, zinc stannate, metastannic acid, tin oxide, oxidized tin salt, zinc sulfate, zinc oxide, calcium borate hydrate, zinc borate, zinc borate hydrate, zinc hydroxide, ferrous oxide, ferric oxide, sulfur sulfide, stannous oxide, stannic oxide, ammonium borate, ammonium octamolybdate, metal salts of tungstic acid, composite oxide of tungsten and metalloid, ammonium sulfamate, zirconium compound, graphite, and swellable graphite, which may be surface-treated with fatty acid, silane coupling agent, or the like. Of those listed above, zinc borate hydrate and swellable graphite are preferable from the viewpoint of flame retardancy, and mixtures of magnesium oxide and aluminum oxide, zinc stannate, metastannic acid, tin oxide, zinc sulfate, zinc oxide, zinc borate, ferrous oxide, ferric oxide, and sulfur sulfide are used preferably as inorganic flame retarder with high retention stability.

Furthermore, fluorine resin may preferably be added with the aim of increasing the flame retardancy as well as preventing the flame-retardant resin composition from melting and dripping during combustion.

Said fluorine resin is a resin that contains fluorine in its molecule, and specifically, its examples include polytetrafluoroethylene, polyhexafluoropropylene, (tetrafluoroethylene/hexafluoropropylene)copolymer, (tetrafluoroethylene/ perfluoroalkyl vinyl ether)copolymer, (tetrafluoroethylene/ethylene)copolymer, (hexafluoropropylene/propylene) copolymer, polyvinylidene fluoride, and (vinylidene fluoride/ethylene)copolymer. In particular, polytetrafluoroethylene, (tetrafluoroethylene/perfluoroalkyl vinyl ether)copolymer, (tetrafluoroethylene/hexafluoropropylene)copolymer, (tetrafluoroethylene/ethylene)copolymer, and polyvinylidene fluoride are preferable, of which polytetrafluoroethylene and (tetrafluoroethylene/ethylene)copolymer are particularly preferable.

The blending quantity of said fluorine resin is preferably 0.05 to 2.0 parts by weight, more preferably 0.1 to 1.5 parts by weight, and still more preferably 0.15 to 1.0 parts by weight, relative to 100 parts by weight of items (A), (B) and (C). It can prevent the resin composition from melting and dripping during combustion when accounts for 0.05 parts by weight or more, while good mechanical characteristics are maintained when accounts for 2.0 parts by weight or less.

Said "(A) a thermoplastic resin" may be combined with resins other than said vinyl resin. In addition to vinyl resin, those serving to improve the impact strength include ethylene-propylene copolymer, ethylene-propylene-disconjugate diene copolymer, ethylene-butene-1 copolymer, natural rubber, Thiokol rubber, polysulfide rubber, polyether rubber, epichlorohydrin rubber, and modified olefin resin produced by epoxy-modifying ethylene with maleic anhydride, other anhydrides, glycidyl methacrylate, or epoxiding agent; and also include those having different degrees of crosslinking, or having various microstructures such as, for instance, cis-structure and trans-structure. Examples of said modified olefin resin produced by epoxy-modifying ethylene with maleic anhydride, other anhydrides, glycidyl methacrylate, or epoxiding agent include ethylene/glycidyl methacrylate, ethylene/butene-1/maleic anhydride, ethylene/propylene/maleic anhydride, ethylene/maleic anhydride, and epoxidized olefin resin produced by epoxidizing ethylene with a peroxide or the like. Commercial products include Bondfast E (ethylene/glycidyl methacrylate) supplied by Sumitomo Chemical Co., Ltd., and MH-5010 and MH-5020 (ethylene/butene-1/maleic anhydride) supplied by Mitsui Chemicals, Inc., which may be, or may not be, combined with vinyl resin. In particular, ethylene/butene-1/maleic anhydride is used preferably because it can largely improve the impact strength.

The blending quantity of said resins other than vinyl resin is preferably 0.1 to 10 parts by weight, more preferably 0.5 to 8 parts by weight, and still more preferably 1 to 6 parts by weight, relative to 100 parts by weight of items (A), (B) and (C). The electric characteristics and ductility are improved when it is 0.1 parts by weight or more, while good mechanical characteristics are maintained when it is 10 parts by weight or less.

Generally known mold releasing agents for plastics including metallic soap of alkaline earth such as calcium stearate, barium stearate, and zinc stearate; fatty acid amide such as fatty acid ester, salt (or partial salt) of fatty acid ester, ethylene bisstearyl amide, and fatty acid amide of condensation polymer of ethylene diamine with stearic acid and sebacic acid or condensation polymer of phenylene diamine with stearic acid and sebacic acid; mixtures of polyalkylene wax, anhydride-modified polyalkylene wax, or above-mentioned lubricants with fluorine resin or fluorine compound; may preferably be added with the aim of improving the releasability in injection molding processes. In particular, metallic soap of alkaline earth such as zinc stearate is used preferably because it contributes to improving the retention stability in addition to releasability in injection molding processes.

The blending quantity of said mold releasing agent is preferably 0.01 to 1.0 part by weight, more preferably 0.02 to 0.8 part by weight, and still more preferably 0.03 to 0.6 part by weight, relative to 100 parts by weight of items (A), (B) and (C). An adequate releasability is achieved when it is 0.01 part by weight or more, while good mechanical characteristics are maintained when it is 1.0 part by weight or less.

Fibrous reinforcing material may be added preferably with the aim of improving the mechanical strength and the heat deformation temperature.

Specific examples of said fibrous reinforcing material include glass fiber, aramid fiber, and carbon fiber. Said glass fiber is chopped strand type or roving type glass fiber which is preferably treated with a silane coupling agent such as aminosilane compound and epoxy silane compound and/or a sizing agent containing urethane, vinyl acetate, bisphenol A diglycidyl ether, or one or more epoxy compounds such as novolac epoxy compound. Said silane coupling agent and/or sizing agent may be mixed with an emulsion. The fiber diameter is preferably 1 to 30 μm, more preferably 5 to 15 μm. Said fiber cross section is circular, but fibrous reinforcing materials to be used may have any appropriate cross section such as an elliptical cross section with any appropriate major-minor axis ratio, a flattened cross section, and a cocoon-like cross section. These fibrous reinforcing materials can improve the flowability in injection molding processes and serve to produce molded articles with little warp.

The blending quantity of said fibrous reinforcing material is preferably 1 to 100 parts by weight, more preferably 2 to 95 parts by weight, and still more preferably 3 to 90 parts by weight, relative to 100 parts by weight of items (A), (B) and (C), from the viewpoint of flowability in injection molding processes and durability of the injection molding machine and die. The mechanical strength and the heat deformation temperature can be improved adequately when it is 1 part by weight or more, while high mechanical strength and heat deformation temperature can be achieved when it is 100 parts by weight or less.

An inorganic filler other than said fibrous reinforcing material may be added so that the molded articles will be improved in some of the following features: crystallization characteristics, arc resistance, anisotropy, mechanical strength, flame retardancy, and heat deformation temperature. In particular, it can reduce the anisotropy and serves to produce molded articles with little warp. Said inorganic filler other than said fibrous reinforcing material may be a needle-like, particulate, powdery, or layer-like inorganic filler, and its examples include glass beads, milled fiber, glass flake, potassium titanate whisker, calcium sulfate whisker, walastenite, silica, kaolin, talc, calcium carbonate, zinc oxide, magnesium oxide, aluminum oxide, mixture of magnesium oxide and aluminum oxide, fine powdery silicic acid, aluminum silicate, silicon oxide, smectite clay mineral (montmorillonite, hectorite), vermiculite, mica, fluor-taeniolite, zirconium phosphate, titanium phosphate, and dolomite, which may be used singly or in combination. In particular, milled fiber, glass flake, kaolin, talc, and mica can be effectively reduce the anisotropy and serves to produce molded articles with little warp. Furthermore, the retention stability is improved effectively when calcium carbonate, zinc oxide, magnesium oxide, aluminum oxide, a mixture of magnesium oxide and aluminum oxide, fine powdery silicic acid, aluminum silicate, or silicon oxide is added in the range of 0.01 to 1 part by weight relative to 100 parts by weight of items (A), (B) and (C).

Said inorganic filler other than said fibrous reinforcing material may be surface-treated with a coupling agent, epoxy compound, ionization agent, or the like. The average particle diameter of said particulate, powdery, or layer-like inorganic filler is preferably 0.1 to 20 μm, particularly preferably 0.2 to 10 μm, from the viewpoint of impact strength. The total of the blending quantity of said inorganic filler other than said fibrous reinforcing material and that of said fibrous reinforcing material aiming to improve the flowability during the molding process and the durability of the molding machine and die is preferably less than 100 parts by weight relative to 100 parts by weight of items (A), (B) and (C), from the viewpoint of the flowability during the molding process.

An epoxy compound may be added with the aim of improving the hydrolysis resistance, and examples include glycidyl ester compound, glycidyl ether compound, and glycidyl ester ether compound, which may be used singly or in combination. It is also preferable to use a catalyst to promote the reaction involving the epoxy compound, and said catalyst is more preferably an alkali metal salt of carboxylic acid or sulfonic acid.

The blending quantity of said epoxy compound is preferably 0.01 to 3.0 parts by weight, more preferably 0.02 to 2.0 parts by weight, and still more preferably 0.03 to 1.0 parts by weight, relative to 100 parts by weight of items (A), (B) and (C), from the viewpoint of improving the hydrolysis resistance. The hydrolysis resistance can be improved adequately when it is 0.01 parts by weight or more, while good mechanical characteristics are maintained when it is 3.0 parts by weight or less.

An oxazoline compound, carbodiimide-modified isocyanate compound, or carbodiimide compound may also be added with the aim of improving the hydrolysis resistance, and they may be used singly or preferably in combination with said epoxy compound as long as their content is less than that of said epoxy compound.

A hindered phenolic antioxidant, phosphite antioxidant, or thioether antioxidant may also be added as a stabilizer to allow the composition to maintain a very high thermal aging resistance if exposed to heat at a high temperature for a long term. These may be used in combination. Their blending quantity is preferably 0.01 to 2.0 part by weight, more preferably 0.02 to 1.5 parts by weight, and still more preferably 0.03 to 1.0 parts by weight, relative to 100 parts by weight of items (A), (B) and (C) from the viewpoint of improving the thermal aging resistance. The thermal aging resistance can be improved adequately when it is 0.01 parts by weight or more, while good mechanical characteristics are maintained when it is 2.0 parts by weight or less.

Carbon black, titanium oxide, or various color pigments or dyes may be added singly or in combination in order to provide resins of different colors and also to improve the weathering properties (light resistance) and electric conductivity. The blending quantity of said pigments and dyes is preferably 0.01 to 3.0 parts by weight, more preferably 0.02 to 2 parts by weight, and still more preferably 0.03 to 1.0 parts by weight, relative to 100 parts by weight of items (A), (B) and (C). The color tone, weathering properties (light resistance), and electric conductivity can be improved when it is 0.01 parts by weight, while good mechanical characteristics are maintained when it is 3.0 parts by weight or less.

Examples of said carbon black include channel black, furnace black, acetylene black, anthracene black, lamp black, soot of burnt pine, and graphite, of which carbon black with an average particle diameter of 500 nm or less and a dibutyl phthalate absorption capacity of 50 to 400 $cm^3/100$ g is used preferably. They may be treated with treating agents such as aluminum oxide, silicon oxide, zinc oxide, zirconium oxide, polyol, and silane coupling agent.

Said titanium oxide preferably comprises rutile-type or anatase-type crystals and has an average particle diameter of 5 μm or less. They may be treated with treating agents such as aluminum oxide, silicon oxide, zinc oxide, zirconium oxide, polyol, and silane coupling agent. Said carbon black, titanium oxide, and various color pigments and dyes may be used in the form of a mixture that is melt-blended or simply blended with various thermoplastic resins in order to improve the dispersibility in the flame-retardant thermoplastic resin composition and the handleability during the production process.

The flame-retardant thermoplastic resin composition and molded articles of the invention, furthermore, may contain one or more generally known additives including ultraviolet absorber, photostabilizer, plasticizer, and antistatic agent, as long as they do not impair the effect of the invention.

With the feature of high flame retardancy and low corrosiveness to metals, molded articles produced from the flame-retardant thermoplastic resin composition of the invention can serve as molded mechanical machine parts, electric/electronic components, and automotive parts.

Examples of said molded mechanical machine parts, electric/electronic components, and automotive parts include breaker, electromagnetic switch, focus case, flyback transformer, molded unit for anchorage devices of copiers and printers, general household appliances, housing of office equipment, cooling fan, variable capacitor case parts, various terminal plates, transformer, print wiring board, housing, terminal block, coil bobbin, connector, relay, disk drive chassis, transformer, switch parts, outlet parts, motor parts, socket, plug, capacitor, various cases, various resistances, electric/electronic components incorporating metal terminals and conductor wires, cable related parts, rechargeable battery related parts, smart meter related parts, computer related parts, printer related parts, audio parts such as sound parts, lighting parts, telegraph/telephone equipment related parts, air-conditioner parts, VTRs/TVs, refrigerator, washing machine, parts of household electric appliances such as washing machine, copier parts, facsimile parts, optical equipment parts, automobile ignition device parts, connector for automobiles, and various electrical equipment parts for automobiles.

The flame-retardant thermoplastic resin composition of the invention can be produced by generally known methods. For instance, the flame-retardant thermoplastic resin composition can be produced by preliminarily mixing "(A) a thermoplastic resin", "(B) a phosphinic acid salt, and "(C) a compound of a specific structure" and supplying the mixture to an extruder or the like, followed by adequate melt-kneading; or by using a metering feeder such as weigh-feeder to supply predetermined quantity of each component to an extruder or the like, followed by adequate melt-kneading.

Said preliminarily mixing may be carried out by simple dry blending, but may also be carried out by using mechanical mixing equipment such as tumbler, ribbon mixer, and Henschel mixer. Said fibrous reinforcing material or said inorganic filler other than said fibrous reinforcing material may be supplied through a side feeder installed between the loading portion and the vent portion of a multi-axis extruder such as twin screw extruder. A liquid additive may be supplied by a plunger pump through a liquid feeding nozzle installed between the loading portion and the vent portion of a multi-axis extruder such as twin screw extruder, or by a metering pump through the loading portion or the like.

If melt-kneading is to be carried out, the required temperature conditions include only a temperature where item (A) can be melted, but it is preferably in the range of 150 to 350° C. It is preferably 300° C. or less, more preferably 280° C. or less, and still more preferably 260° C. or less, from the viewpoint of preventing the corrosion of metal parts in the kneading equipment such as extruder, and furthermore, it is preferably 200° C. or more, more preferably 220° C. or more, and still more preferably 240° C. or more, from the viewpoint of improving the mechanical strength and flowability and reducing the gas generation rate during heating.

For producing the flame-retardant thermoplastic resin composition, a Unimelt or Dulmadge screw type single screw extruder, twin screw extruder, triple screw extruder, conical extruder, or kneading machine is used to discharge it into a strand, followed by cutting it with a strand cutter into pellets.

Such pellets of the flame-retardant thermoplastic resin composition may be produced through injection molding performed by a generally known method. Examples of said injection molding method include gas assist molding, two-color molding, sandwich molding, in-mold molding, insert molding, and injection press molding, in addition to common injection molding processes, any of which may be applied.

EXAMPLES

The effect of the invention is described more in detail below with reference to Examples. Here, "%" and "part(s)" always mean "wt %" and "part(s) by weight" respectively, and "/" included in resin names divides the components of copolymers. The characteristics measuring methods used are as described below.

The materials used are as follows.

(A) Thermoplastic Resin

<A-1> polybutylene terephthalate resin, Toraycon (registered trademark) 1401-X31 supplied by Toray Industries, Inc. The PBT used had an intrinsic viscosity of 0.80 (hereinafter referred to as PBT resin).

<A-2> nylon 6 resin, Amilan (registered trademark) CM1010 supplied by Toray Industries, Inc. (hereinafter referred to as polyamide resin)

<A-3> polybutylene terephthalate/polytetramethylene glycol copolymer, Hytrel (registered trademark) 5557 supplied by Du Pont-Toray Co., Ltd. (hereinafter referred to as Hytrel)

<A-4> polycarbonate resin, Panlite (registered trademark) L-1250Y supplied by Teijin Chemicals Ltd. (hereinafter referred to as PC resin)

(B) Phosphinic Acid Salt

<B-1> aluminum diethylphosphinic acid salt, Exolit (registered trademark) OP1240 supplied by Clariant Japan K.K. (hereinafter referred to as OP-1240)

<B-2> aluminum diethylphosphinic acid salt

A 1 kg volume of water was put in a 6L reaction container with a stirrer, and 0.55 kg (3.82 moles) of sodium diethylphosphinic acid salt was fed while stirring, followed by heating at 80° C. Into the container, a solution of 0.22 kg (0.64 moles) of aluminum sulfate and 0.88 kg of water was added while stirring strongly, and allowed to react at 80° C. for 3 hours while stirring. The reaction product was separated by aspiration filtration, washed in 2.5 L of hot water, and dried at 120° C. under reduced pressure to produce solid material, which was crushed to provide 450 g of white powder of aluminum diethylphosphinic acid salt. Results of elemental analysis showed that the phosphorus and aluminum contents were 23.6% (calculated value: 23.8%) and 7.0% (calculated value: 6.9%), respectively.

<B-3> aluminum ethyl(methyl)phosphinic acid salt

A 1.5 kg volume of water was put in a 3 L reaction container with a stirrer, and 520 g (4.8 moles) of ethyl(methyl) phosphinic acid was fed while stirring to ensure dissolution. A 125 g (1.6 moles) volume of aluminum hydroxide was added while stirring strongly, and allowed to react at 85° C. for 60 hours while stirring. The reaction product was cooled to 60° C. and separated by aspiration filtration, and dried at 130° C. under reduced pressure to produce solid material, which was crushed to provide 520 g of white powder of aluminum ethyl(methyl)phosphinic acid salt. Results of elemental analysis showed that the phosphorus and aluminum contents were 26.5% (calculated value: 26.7%) and 7.9% (calculated value: 7.8%), respectively.

<B-4> zinc ethyl(methyl)phosphinic acid salt

In a 1 L reaction container with a stirrer, 270 g (2.50 moles) of ethyl(methyl)phosphinic acid, 102 g (1.25 mol) of zinc oxide, and 300 g of acetic acid were fed, and stirred at 100° C. for 2 hours to provide a transparent solution. Then, acetic acid was remove by distillation, and the resulting reaction mixture was vacuum-dried at 130° C. to provide a solid material, which was crushed to provide 350 g of white powder of zinc ethyl(methyl)phosphinic acid salt (with a melting point of 205° C.). Results of elemental analysis showed that the phosphorus and zinc contents were 22.0% (calculated value: 22.1%) and 23.5% (calculated value: 23.4%), respectively.

(C) A Compound having a Structure as Represented by Formula (1) Given Below

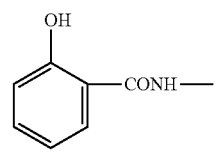

(1)

<C-1> compound as represented by the formula given below, CDA-1 supplied by Adeka Corporation (hereinafter referred to as CDA-1)

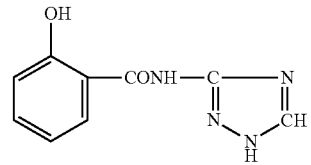

<C-2> mixture of a compound as represented by the formula given below and an organic compound, CDA-1M supplied by Adeka Corporation (hereinafter referred to as CDA-1M)

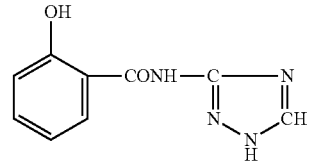

<C-1> compound as represented by the formula given below, CDA-6 supplied by Adeka Corporation (hereinafter referred to as CDA-6)

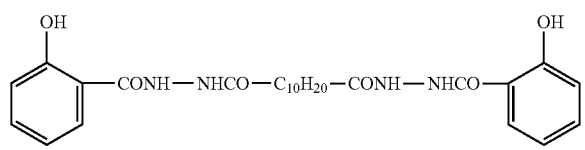

(D) An Acidic Phosphate Compound

<D-1> long chain alkyl acid phosphate compound, Adeka Stab AX-71 supplied by Adeka Corporation (hereinafter referred to as AX-71)

(E) One or More Phosphorus Compounds Selected from the Group of Phosphate Compound, Phosphazene Compound, and Phosphaphenanthrene Compound <E-1> phosphate compound, a triphenyl phosphate product supplied by Daihachi Chemical Industry Co., Ltd. (hereinafter referred to as phosphate compound and triphenyl phosphate)

<E-2> phosphate compound, PX-200 condensed phosphate compound supplied by Daihachi Chemical Industry Co., Ltd. (hereinafter referred to as PX-200 phosphate compound)

<E-3> phosphazene compound, Rabitle (registered trademark) FP-110 supplied by Fushimi Pharmaceutical Co., Ltd. (hereinafter referred to as phosphazene compound)

<E-4> phosphaphenanthrene compound, M-Ester supplied by Sanko Co., Ltd. (hereinafter referred to as phosphaphenanthrene compound)

(F) Nitrogen Compound Based Flame Retarder

<F-1> salt of a triazine-based nitrogen-containing heterocyclic compound and cyanuric acid or isocyanuric acid, MC-4000 supplied by Nissan Chemical Industries, Ltd. (hereinafter referred to as MCA)

<F-2> melamine polyphosphate as nitrogen-containing heterocyclic compound, Melapur (registered trademark) 200 supplied by DSM (hereinafter referred to as melamine polyphosphate)

(G) Components to be Added as Needed

<G-1> polyfunctional compound with three or more functional groups, PNT-60U polyoxyethylene pentaerythritol supplied by Nippon Nyukazai Co., Ltd. (molecular weight 400, 1.5 alkylene oxide (ethylene oxide) units per functional group) (hereinafter referred to as polyhydric alcohol)

<G-2> vinyl resin, epoxy-modified AS resin consisting of styrene/acrylonitrile/glycidyl methacrylate=70/29.5/0.5 wt % (hereinafter referred to as epoxidized AS)

<G-3> non-vinyl resin, Tafmer (registered trademark) MH-5020 ethylene/butene-1/maleic anhydride copolymer, supplied by Mitsui Chemicals, Inc. (hereinafter referred to as MH-5020)

<G-4> fluorine resin, Teflon (registered trademark) 6-J polytetrafluoroethylene supplied by Du Pont-Mitsui Fluorochemicals Co., Ltd. (hereinafter referred to as fluorine resin)

<G-5> fibrous reinforcing material, chopped-strand glass fiber with a fiber diameter of about 10 μm, CS3J948 supplied by Nitto Boseki Co., Ltd. (hereinafter referred to as GF)

(H) Other Additives to be Added as Needed

<H-1> hindered phenolic antioxidant, IRGANOX (registered trademark) 1010 tetrakis[methylene-3-(3',5'-di-t-butyl-4'-hydroxyphenyl) propionate] methane supplied by Ciba (hereinafter referred to as IR-1010)

<H-2> ultraviolet absorber, TINUVIN (registered trademark) P 2-(5-methyl-2-hydroxyphenyl) benzotriazole supplied by Ciba (hereinafter referred to as TI-P)

<H-3> photostabilizer, TINUVIN (registered trademark) 144 bis(1,2,2,6,6-pentamethyl-4-piperidyl) 2-(3,5-t-butyl-4-hydroxybenzyl)-2-n-butyl malonate supplied by Ciba (hereinafter referred to as TI-144)

<H-4> metal deactivator, IRGANOX (registered trademark) MD1024 N,N'-bis[3-(3.5-di-t-butyl-4-hydroxyphenyl)propionyl]hydrazine, supplied by Ciba (hereinafter referred to as MD 1024)

<H-5> phosphite antioxidant, IRGAFOS (registered trademark) 168 tris-(2,4-di-t-butyl phenyl)phosphite supplied by Ciba (hereinafter referred to as IR-168)

<H-6> melamine, reagent supplied by Wako Pure Chemical Industries, Ltd.

<H-7> metal oxide, magnesium oxide reagent supplied by Wako Pure Chemical Industries, Ltd.

For Examples and Comparative examples, the measuring methods described below were used for characteristics evaluation.

1. Tensile Properties

Using an IS55EPN injection molding machine supplied by Toshiba Machine Co., ASTM No. 1 dumbbell-shaped test pieces with a thickness of ⅛ inch (about 3.2 mm) for tensile properties evaluation test were prepared under molding cycle conditions including a molding temperature of 270° C., die temperature of 80° C., total of injection time and pressure dwell time of 10 seconds, and cooling time of 10 seconds. For these test pieces for mechanical strength evaluation test, the tensile strength and elongation were measured according to ASTM D638 (2005), and the average of three measurements was used for evaluation.

2. Flame Retardancy

Using an IS55EPN injection molding machine supplied by Toshiba Machine Co., test pieces with a thickness of 1/16" (about 1.59 mm) or 1/32 inch (about 0.79 mm) for combustion test were prepared under conditions including a molding temperature of 270° C. and a die temperature of 80° C.

The flame retardancy of these combustion test pieces were evaluated according to the evaluation criteria specified for the UL94 vertical burning test. For flame retardancy, the test pieces were rated as V-0, V-1, or V-2 in degrading order. A test piece with poor flame retardancy that did not meet the V-2 criteria and fall under any of the above rating category, was rated as substandard.

During the combustion test, observation was performed to see if part of the test piece melted in the heat and dropped after the first and second contacts with the flame. A test piece that did not drop was evaluated as "non-drip."

3. Metal corrosion test through heat treatment at heat-treatment temperature of 270° C. and heat-treatment time of 3 hours (hereinafter referred to as metal corrosion test) An about 10 g amount of flame-retardant thermoplastic resin composition pellets were put in a 60 mm-diameter glass petri dish with a glass lid, followed by covering the pellets with a 25 mm-diameter watch glass, putting a 10 mm×20 mm, 1 mm-thick copper plate on the watch glass, and closing the petri dish with said glass lid to provide a specimen. This specimen was left in a Geer oven, GPHH-200 supplied by Tabai Espec Corporation, at a controlled temperature of 270° C. for 3 hours, and cooled down to room temperature, and visually observed to inspect the degree of corrosion of the copper plate in the specimen. A corroded copper plate becomes aeruginous as it suffers verdigris, i.e. rust forming on copper. For evaluation, therefore, a copper plate is considered corroded if it has become aeruginous.

4. Impact Strength

Using an IS55EPN injection molding machine supplied by Toshiba Machine Co., test pieces with a thickness of ⅛ inch (about 3.2 mm) for Izod impact test were injection-molded under conditions including a molding temperature of 270° C. and a die temperature of 80° C., and their unnotched Izod impact strength was measured according to ASTM D256-05. Seven measurements were made and their average was used for evaluation. Test pieces with a higher Izod impact strength are higher in impact resistance.

5. Tracking Resistance

Using an IS55EPN injection molding machine supplied by Toshiba Machine Co., 80 mm×80 mm square test pieces with a thickness of 3 mm were injection-molded under conditions including a molding temperature of 270° C. and a die temperature of 80° C. According to IEC Publication 112, a 0.1% aqueous ammonium chloride solution, used as electrolyte liquid, was dropped at a rate of one droplet in 30±5 seconds, and the number of droplets required before rupture was plotted against the applied voltage to determine, from the curve, the voltage at which 50 droplets were consumed to cause the test piece to rupture. This voltage was taken as comparative tracking index (V). Test pieces with a higher comparative tracking index are higher in tracking resistance.

6. Flowability

When ASTM No. 1 dumbbell-shaped test pieces for tensile properties evaluation in paragraph 1 were prepared using an IS55EPN injection molding machine supplied by Toshiba Machine Co., the minimum pressure required for the molded article to fill the mold was measured, and results were compared. Test pieces with a lower minimum pressure are higher in flowability.

7. Retention Stability

According to ASTM D1238-00, pellets were used to determine the retention stability under conditions including a measuring temperature of 270° C., load of 21.2N, and a retention time of 5 minutes (MFR5 min) or a retention time of 30 minutes (MFR30 min). MFR30 min was divided by MFR5 min, and the quotient was taken as the rate of change in MFR. Test pieces with a lower rate of change in MFR are higher in retention stability.

Examples 1 to 39

Comparative Examples 1 to 13

A co-rotating, vent-equipped, twin screw extruder with a screw diameter of 30 mm and L/D ratio of 35 (TEX-30α supplied by The Japan Steel Works, Ltd.) was used. "(A) a thermoplastic resin", "(B) a phosphinic acid salt", "(C) a compound having a structure as represented by Formula (1) given above," and other various additives as needed were mixed according to the compositions shown in Tables 1 to 6, and fed through the loading portion of the twin screw extruder. The glass fiber used as fibrous reinforcing material (<G-5>) was fed through a side feeder installed between the loading portion and the vent portion. Melting and mixing were carried out under extrusion conditions including a kneading temperature of 270° C. and a screw rotation rate of 150 rpm, and the melts were discharged into a strand, which was passed through a cooling bath and cut by a strand cutter into pellets. The resulting pellets were dried in a hot air drier at 110° C. for 6 hours, and molded in an IS55EPN injection molding machine supplied by Toshiba Machine Co. to provide various molded articles. Their characteristics were measured by the measuring methods described above, and results shown in Tables 1 to 6 were obtained.

TABLE 1

| Materials | | Code | Unit | Example 1 | Example 2 | Example 3 | Example 4 | Example 5 |
|---|---|---|---|---|---|---|---|---|
| (A) thermoplastic resin | PBT resin | A-1 | wt % | 87.0 | 87.0 | 87.0 | 87.0 | 87.0 |
| | polyamide resin | A-2 | wt % | | | | | |
| (B) phosphinic acid salt | OP-1240 | B-1 | wt % | 12.98 | 12.80 | 12.95 | | |
| | | B-2 | wt % | | | | 12.80 | |
| | | B-3 | wt % | | | | | 12.80 |
| | | B-4 | wt % | | | | | |
| (C) CDA-1 | | C-1 | wt % | 0.02 | | | | |
| (C) CDA-1M | | C-2 | wt % | | 0.20 | | 0.20 | 0.20 |
| (C) CDA-6 | | C-3 | wt % | | | 0.05 | | |
| (A) + (B) + (C) | | | parts by weight | 100 | 100 | 100 | 100 | 100 |
| tensile properties | tensile strength | | MPa | 51 | 53 | 50 | 53 | 50 |
| | tensile elongation | | % | 4.2 | 4.5 | 4.1 | 4.4 | 3.9 |
| metal corrosion test | | | visual observation decision | free from corrosion | free from corrosion | free from corrosion | free from corrosion | free from corrosion |
| flame retardancy (UL-94vertical test) | 1/16" thick | | decision | V-0 | V-0 | V-0 | V-0 | V-0 |
| | 1/32" thick | | decision | V-1 | V-1 | V-1 | V-1 | V-1 |

| Materials | | Code | Unit | Example 6 | Example 7 | Example 8 | Example 9 |
|---|---|---|---|---|---|---|---|
| (A) thermoplastic resin | PBT resin | A-1 | wt % | 87.0 | | | |
| | polyamide resin | A-2 | wt % | | 84.5 | 84.5 | 84.5 |
| (B) phosphinic acid salt | OP-1240 | B-1 | wt % | | 15.45 | 15.00 | 15.40 |
| | | B-2 | wt % | | | | |
| | | B-3 | wt % | | | | |
| | | B-4 | wt % | 12.80 | | | |
| (C) CDA-1 | | C-1 | wt % | | 0.05 | | |
| (C) CDA-1M | | C-2 | wt % | 0.20 | | 0.50 | |

TABLE 1-continued

| | | | | | | |
|---|---|---|---|---|---|---|
| (C) CDA-6 | C-3 | wt % | | | | 0.10 |
| (A) + (B) + (C) | | parts by weight | 100 | 100 | 100 | 100 |
| tensile properties | tensile strength | MPa | 47 | 67 | 69 | 66 |
| | tensile elongation | % | 3.8 | 4.0 | 4.3 | 4.1 |
| metal corrosion test | | visual observation | free from corrosion | free from corrosion | free from corrosion | free from corrosion |
| flame retardancy (UL-94 vertical test) | 1/16" thick | decision | V-1 | V-0 | V-0 | V-0 |
| | 1/32" thick | decision | V-2 | V-0 | V-0 | V-0 |

TABLE 2

| Materials | | Code | Unit | Comparative example | | | | |
|---|---|---|---|---|---|---|---|---|
| | | | | 1 | 2 | 3 | 4 | 5 |
| (A) thermoplastic resin | PBT resin | A-1 | wt % | 87.0 | 87.0 | | 87.0 | 87.0 |
| | polyamide resin | A-2 | wt % | | | 84.5 | | |
| (B) phosphinic acid salt | OP-1240 | B-1 | wt % | 13.00 | 12.00 | 15.50 | 13.00 | 13.00 |
| (C) CDA-1 | | C-1 | wt % | | 1.00 | | | |
| (A) + (B) + (C) | | | parts by weight | 100 | 100 | 100 | 100 | 100 |
| (H) hindered phenolic antioxidant | IR-1010 | H-1 | parts by weight | | | | 0.2 | |
| (H) ultraviolet absorber | TI-P | H-2 | parts by weight | | | | | 0.2 |
| (H) photostabilizer | TI-144 | H-3 | parts by weight | | | | | |
| (H) metal deactivator | MD1024 | H-4 | parts by weight | | | | | |
| (H) phosphite antioxidant | IR-168 | H-5 | parts by weight | | | | | |
| (H) melamine | | H-6 | parts by weight | | | | | |
| (H) metal oxide | magnesium oxide | H-7 | parts by weight | | | | | |
| tensile properties | tensile strength | | MPa | 52 | 31 | 67 | 52 | 48 |
| | tensile elongation | | % | 4.5 | 1.6 | 4.0 | 4.5 | 3.9 |
| metal corrosion test | | | visual observation | corroded | free from corrosion | corroded | corroded | corroded |
| flame retardancy (UL-94 vertical test) | 1/16" thick | | decision | V-0 | V-0 | V-0 | V-0 | V-0 |
| | 1/32" thick | | decision | V-1 | V-1 | V-0 | V-1 | V-1 |

| Materials | | Code | Unit | Comparative example | | | | |
|---|---|---|---|---|---|---|---|---|
| | | | | 6 | 7 | 8 | 9 | 10 |
| (A) thermoplastic resin | PBT resin | A-1 | wt % | 87.0 | 87.0 | 87.0 | 87.0 | 87.0 |
| | polyamide resin | A-2 | wt % | | | | | |
| (B) phosphinic acid salt | OP-1240 | B-1 | wt % | 13.00 | 13.00 | 13.00 | 13.00 | 13.00 |
| (C) CDA-1 | | C-1 | wt % | | | | | |
| (A) + (B) + (C) | | | parts by weight | 100 | 100 | 100 | 100 | 100 |
| (H) hindered phenolic antioxidant | IR-1010 | H-1 | parts by weight | | | | | |
| (H) ultraviolet absorber | TI-P | H-2 | parts by weight | | | | | |
| (H) photostabilizer | TI-144 | H-3 | parts by weight | 0.2 | | | | |
| (H) metal deactivator | MD1024 | H-4 | parts by weight | | 0.2 | | | |
| (H) phosphite antioxidant | IR-168 | H-5 | parts by weight | | | 0.2 | | |
| (H) melamine | | H-6 | parts by weight | | | | 0.2 | |
| (H) metal oxide | magnesium oxide | H-7 | parts by weight | | | | | 0.2 |
| tensile properties | tensile strength | | MPa | 46 | 47 | 50 | 46 | 45 |
| | tensile elongation | | % | 3.7 | 3.8 | 4.1 | 3.7 | 3.6 |
| metal corrosion test | | | visual observation | corroded | corroded | corroded | corroded | corroded |
| flame retardancy (UL-94 vertical test) | 1/16" thick | | decision | V-0 | V-0 | V-0 | V-0 | V-0 |
| | 1/32" thick | | decision | V-1 | V-1 | V-1 | V-1 | V-1 |

TABLE 3

| Materials | | Code | Unit | Example | | | | | | |
|---|---|---|---|---|---|---|---|---|---|---|
| | | | | 10 | 11 | 12 | 13 | 14 | 15 | 16 |
| (A) thermoplastic resin | PBT resin | A-1 | wt % | 87.0 | 87.0 | 87.0 | 87.0 | 87.0 | 87.0 | 87.0 |
| | polyamide resin | A-2 | wt % | | | | | | | |
| (B) phosphinic acid salt | OP-1240 | B-1 | wt % | 12.98 | 12.98 | 12.98 | 12.98 | 12.98 | 12.98 | 12.98 |

TABLE 3-continued

| Materials | | Code | Unit | Example 10 | 11 | 12 | 13 | 14 | 15 | 16 |
|---|---|---|---|---|---|---|---|---|---|---|
| (C) CDA-1 | | C-1 | wt % | 0.02 | 0.02 | 0.02 | 0.02 | 0.02 | 0.02 | 0.02 |
| (A) + (B) + (C) | | | parts by weight | 100 | 100 | 100 | 100 | 100 | 100 | 100 |
| (E) phosphoric acid ester compound | triphenyl phosphate | E-1 | parts by weight | 0.5 | | | | | | |
| | PX-200 | E-2 | parts by weight | | 0.5 | | | | | |
| (E) phosphazene compound | | E-3 | parts by weight | | | 0.5 | | | | |
| (E) phosphaphenanthrene compound | | E-4 | parts by weight | | | | 0.5 | | | |
| (F) nitrogen compound based flame retardant | MCA | F-1 | parts by weight | | | | | 1.0 | | |
| | melamine polyphosphate | F-2 | parts by weight | | | | | | 1.0 | |
| (G) polyhydric alcohol | | G-1 | parts by weight | | | | | | | 0.5 |
| (G) epoxidized AS | | G-2 | parts by weight | | | | | | | |
| (G) MH-5020 | | G-3 | parts by weight | | | | | | | |
| (G) fluorine resin | | G-4 | parts by weight | | | | | | | |
| (G) GF | | G-5 | parts by weight | | | | | | | |
| tensile properties | tensile strength | | MPa | 55 | 53 | 55 | 50 | 49 | 47 | 52 |
| | tensile elongation | | % | 4.4 | 4.3 | 4.4 | 3.7 | 3.7 | 3.6 | 4.2 |
| metal corrosion test | | | visual observation | free from corrosion | free from corrosion | free from corrosion | free from corrosion | free from corrosion | free from corrosion | free from corrosion |
| flame retardancy (UL-94vertical test) | 1/16" thick | | decision | V-0 | V-0 | V-0 | V-0 | V-0 | V-0 | V-0 |
| | 1/32" thick | | decision | V-0 | V-0 | V-0 | V-0 | V-0 | V-0 | V-0 |
| impact strength | | | kJ/m² | 30 | 30 | 30 | 29 | 29 | 29 | 28 |
| tracking resistance | | | V | 550 | 550 | 550 | 550 | 550 | 550 | 525 |

TABLE 4

| Materials | | Code | Unit | Example 17 | 18 | 19 | 20 | 21 | 22 | 23 |
|---|---|---|---|---|---|---|---|---|---|---|
| (A) thermoplastic resin | PBT resin | A-1 | wt % | 87.0 | 87.0 | 87.0 | 83.0 | 83.0 | 83.0 | 70.0 |
| | polyamide resin | A-2 | wt % | | | | | | | |
| (B) phosphinic acid salt | OP-1240 | B-1 | wt % | 12.98 | 12.98 | 12.98 | 16.97 | | 16.97 | 29.96 |
| | | B-4 | wt % | | | | | 16.97 | | |
| (C) CDA-1 | | C-1 | wt % | 0.02 | 0.02 | 0.02 | 0.03 | 0.03 | 0.03 | 0.04 |
| (A) + (B) + (C) | | | parts by weight | 100 | 100 | 100 | 100 | 100 | 100 | 100 |
| (E) phosphoric acid ester compound | triphenyl phosphate | E-1 | parts by weight | | | 0.5 | 0.5 | | | |
| | PX-200 | E-2 | parts by weight | | | | | | | |
| (E) phosphazene compound | | E-3 | parts by weight | | | | | | | |
| (E) phosphaphenanthrene compound | | E-4 | parts by weight | | | | | | | |
| (F) nitrogen compound based flame retardant | MCA | F-1 | parts by weight | | | | 15.0 | 15.0 | 15.0 | 15.0 |
| | melamine polyphosphate | F-2 | parts by weight | | | | | | | |
| (G) polyhydric alcohol | | G-1 | parts by weight | | | | | | | |
| (G) epoxidized AS | | G-2 | parts by weight | | 5.0 | | | | | |
| (G) MH-5020 | | G-3 | parts by weight | | | 5.0 | | | 5.0 | |
| (G) fluorine resin | | G-4 | parts by weight | 0.2 | 0.2 | 0.2 | | | | |
| (G) GF | | G-5 | parts by weight | | | | 20.0 | 20.0 | 20.0 | 50.0 |
| tensile properties | tensile strength | | MPa | 52 | 54 | 46 | 85 | 75 | 83 | 103 |
| | tensile elongation | | % | 4.2 | 4.0 | 6.6 | 3.1 | 2.7 | 3.4 | 2.5 |
| metal corrosion test | | | visual observation | free from corrosion | free from corrosion | free from corrosion | free from corrosion | free from corrosion | free from corrosion | free from corrosion |
| flame retardancy (UL-94vertical test) | 1/16" thick | | decision | V-0 | V-0 | V-0 | V-0 | V-0 | V-0 | V-0 |
| | 1/32" thick | | decision | V-0 | V-0 | V-0 | V-0 | V-1 | V-0 | V-0 |
| impact strength | | | kJ/m² | 28 | 31 | 42 | 34 | 29 | 46 | 38 |
| tracking resistance | | | V | 550 | 650 | 575 | 600 | 550 | 650 | 625 |

TABLE 5

| Materials | | Code | Unit | Example 24 | 25 | 26 | 27 | 28 | 29 |
|---|---|---|---|---|---|---|---|---|---|
| (A) thermoplastic resin | PBT resin | A-1 | wt % | 87.0 | 87.0 | 87.0 | 85.0 | 82.0 | 82.0 |
| | Hytrel | A-3 | wt % | | | | 2.0 | 5.0 | 5.0 |

TABLE 5-continued

| Materials | | Code | Unit | Example 24 | Example 25 | Example 26 | Example 27 | Example 28 | Example 29 |
|---|---|---|---|---|---|---|---|---|---|
| (B) phosphinic acid salt | OP-1240 | B-1 | wt % | 12.80 | 12.80 | | 12.80 | 12.80 | 12.80 |
| | | B-4 | wt % | | | 12.80 | | | |
| (C) CDA-1M | | C-2 | wt % | 0.20 | 0.20 | 0.20 | 0.20 | 0.20 | 0.20 |
| (A) + (B) + (C) | | | parts by weight | 100 | 100 | 100 | 100 | 100 | 100 |
| (D) acidic phosphoric acid ester compound | AX-71 | D-1 | parts by weight | 0.1 | 0.4 | 0.4 | | | 0.1 |
| tensile properties | tensile strength | | MPa | 53 | 54 | 48 | 52 | 50 | 50 |
| | tensile elongation | | % | 6.1 | 6.3 | 4.9 | 8.0 | 10.6 | 14.2 |
| metal corrosion test | | | visual observation | free from corrosion | free from corrosion | free from corrosion | free from corrosion | free from corrosion | free from corrosion |
| flame retardancy | 1/16" thick | | decision | V-0 | V-0 | V-1 | V-0 | V-0 | V-0 |
| (UL-94vertical test) | 1/32" thick | | decision | V-1 | V-1 | V-2 | V-1 | V-1 | V-1 |

TABLE 6

| Materials | | Code | Unit | Example 30 | Example 31 | Example 32 | Example 33 | Example 34 | Example 35 | Example 36 |
|---|---|---|---|---|---|---|---|---|---|---|
| (A) thermoplastic resin | PBT resin | A-1 | wt % | 80.0 | 75.0 | 70.0 | 65.0 | 75.0 | 70.0 | 70.0 |
| | PC resin | A-4 | wt % | | 5.0 | 10.0 | 15.0 | 5.0 | 10.0 | 10.0 |
| (B) phosphinic acid salt | OP-1240 | B-1 | wt % | 19.85 | 19.85 | 19.85 | 19.85 | 19.85 | 19.85 | 19.85 |
| | | B-4 | wt % | | | | | | | |
| (C) CDA-1 | | C-1 | wt % | 0.15 | 0.15 | 0.15 | 0.15 | 0.15 | 0.15 | 0.15 |
| (A) + (B) + (C) | | | parts by weight | 100 | 100 | 100 | 100 | 100 | 100 | 100 |
| (D) acidic phosphoric acid ester compound | AX-71 | D-1 | parts by weight | 0.2 | 0.2 | 0.2 | 0.2 | 0.2 | 0.2 | 0.2 |
| (E) phosphoric acid ester compound | triphenyl phosphate | E-1 | parts by weight | | | | | 4.0 | 2.0 | 4.0 |
| | PX-200 | E-2 | parts by weight | | | | | | | |
| (G) fluorine resin | | G-4 | parts by weight | 0.2 | 0.2 | 0.2 | 0.2 | 0.2 | 0.2 | 0.2 |
| (G) GF | | G-5 | parts by weight | 45.0 | 45.0 | 45.0 | 45.0 | 45.0 | 45.0 | 45.0 |
| tensile properties | tensile strength | | MPa | 100 | 125 | 120 | 113 | 135 | 132 | 134 |
| | tensile elongation | | % | 2.6 | 3.4 | 2.9 | 2.2 | 3.7 | 3.3 | 3.4 |
| metal corrosion test | | | visual observation | free from corrosion | free from corrosion | free from corrosion | free from corrosion | free from corrosion | free from corrosion | free from corrosion |
| flame retardancy | 1/16" thick | | decision | V-0 | V-0 | V-0 | V-0 | V-0 | V-0 | V-0 |
| (UL-94vertical test) | 1/32" thick | | decision | V-0 | V-0 | V-0 | V-0 | V-0 | V-0 | V-0 |
| impact strength | | | kJ/m$^2$ | 30 | 32 | 33 | 28 | 39 | 44 | 42 |
| retention stability | retention time 5 min | | g/10 min | 4 | 3 | 2 | 1 | 4 | 4 | 6 |
| | retention time 30 min | | g/10 min | 12 | 10 | 10 | 7 | 6 | 24 | 32 |
| | rate of change in MFR | | | 3.0 | 3.3 | 5.0 | 7.0 | 1.5 | 6.0 | 5.3 |

| Materials | | Code | Unit | Example 37 | Example 38 | Example 39 | Comparative example 11 | Comparative example 12 | Comparative example 13 |
|---|---|---|---|---|---|---|---|---|---|
| (A) thermoplastic resin | PBT resin | A-1 | wt % | 70.0 | 70.0 | 70.0 | 80.0 | 70.0 | 70.0 |
| | PC resin | A-4 | wt % | 10.0 | 10.0 | 10.0 | | 10.0 | 10.0 |
| (B) phosphinic acid salt | OP-1240 | B-1 | wt % | | 19.85 | 19.85 | 20.00 | 20.00 | 20.00 |
| | | B-4 | wt % | 19.85 | | | | | |
| (C) CDA-1 | | C-1 | wt % | 0.15 | 0.15 | 0.15 | | | |
| (A) + (B) + (C) | | | parts by weight | 100 | 100 | 100 | 100 | 100 | 100 |
| (D) acidic phosphoric acid ester compound | AX-71 | D-1 | parts by weight | 0.2 | 0.2 | 0.2 | 0.2 | 0.2 | 0.2 |
| (E) phosphoric acid ester compound | triphenyl phosphate | E-1 | parts by weight | 4.0 | | 10.0 | | | 4.0 |
| | PX-200 | E-2 | parts by weight | | 4.0 | | | | |
| (G) fluorine resin | | G-4 | parts by weight | 0.2 | 0.2 | 0.2 | 0.2 | 0.2 | 0.2 |
| (G) GF | | G-5 | parts by weight | 45.0 | 45.0 | 45.0 | 45.0 | 45.0 | 45.0 |
| tensile properties | tensile strength | | MPa | 124 | 134 | 130 | 90 | 110 | 122 |
| | tensile elongation | | % | 2.9 | 3.2 | 3.1 | 2.3 | 2.7 | 3.1 |
| metal corrosion test | | | visual observation | free from corrosion | free from corrosion | free from corrosion | corroded | corroded | corroded |
| flame retardancy | 1/16" thick | | decision | V-0 | V-0 | V-0 | V-0 | V-0 | V-0 |
| (UL-94vertical test) | 1/32" thick | | decision | V-0 | V-0 | V-0 | V-1 | V-0 | V-0 |
| impact strength | | | kJ/m$^2$ | 35 | 42 | 38 | 27 | 30 | 38 |

TABLE 6-continued

| retention stability | retention time 5 min | g/10 min | 8 | 4 | 10 | 7 | 3 | 4 |
|---|---|---|---|---|---|---|---|---|
| | retention time 30 min | g/10 min | 55 | 21 | 40 | 25 | 35 | 32 |
| | rate of change in MFR | | 6.9 | 5.3 | 4.0 | 3.6 | 11.7 | 8.0 |

Comparison between results of Examples 1 to 9 shown in Table 1 and those of Comparative examples 1 to 3 shown in Table 2 suggests that the addition of "(C) a compound having a structure as represented by Formula (1) given above" to the flame-retardant thermoplastic resin composition consisting of "(A) a thermoplastic resin" and "(B) a phosphinic acid salt" serves to produce a flame-retardant thermoplastic resin composition that does not corrode metals while maintaining flame retardancy and physical properties. The flame-retardant thermoplastic resin composition samples prepared in Comparative example 2 that contain the compound of item (C) in a larger amount than specified are much poorer in physical properties as represented by the reduction by half in tensile strength though not corrosive to metals. When generally known additives were added instead of the compound of item (C) in Comparative examples 4 to 10 as shown in Table 2, all samples were found to be corrosive. This suggests that these generally known additives cannot improve the corrosive properties and that the compound of item (C) has specific effect.

Improved mechanical properties and flame retardancy were achieved when the metal component in item (B) was aluminum, and highly improved mechanical properties and flame retardancy were achieved when aluminum diethylphosphinic acid salt was used.

Results in Examples 10 to 15 shown in Table 3 and those in Example 17 shown in Table 4 suggest that that the flame-retardant thermoplastic resin composition samples containing a phosphorus compound of item (E) and/or a nitrogen compound based flame retarder of item (F) and the flame-retardant thermoplastic resin composition samples containing fluorine resin had still higher flame retardancy while maintaining improved metal-corrosive properties.

The flame-retardant thermoplastic resin composition samples containing polyhydric alcohol prepared in Example 16 as shown in Table 3 had high flowability during injection molding while maintaining improved metal-corrosive properties. Specifically, the minimum pressure was 3.8 MPa (gauge pressure) in Example 1, while it was 2.9 MPa (gauge pressure) in Example16 for flame-retardant thermoplastic resin composition samples containing polyhydric alcohol. Thus, molded articles were produced at lower pressure, indicating a higher flowability, in the latter case.

The flame-retardant thermoplastic resin composition samples containing epoxidized AS prepared in Example 18 as shown in Table 4 had a slightly increased impact strength and a high tracking resistance, which is one of electric characteristics, while maintaining improved metal-corrosive properties. The flame-retardant thermoplastic resin composition samples containing MH-5020 prepared in Examples 19 and 22 as shown in Table 4 had a largely increased impact strength while maintaining improved metal-corrosive properties. The flame-retardant thermoplastic resin composition samples containing GF prepared in Examples 20 to 23 as shown in Table 4 had a largely increased tensile strength while maintaining improved metal-corrosive properties.

Comparison between the results obtained in Examples 24 to 25 and those in Example 2 shown in Table 5 indicates that the flame-retardant thermoplastic resin composition samples containing an acidic phosphate compound of item (D) had a further increased tensile elongation while maintaining the tensile strength and flame retardancy.

As in the case of using a polybutylene terephthalate as item (A) in Examples 27 to 28 as shown in Table 5, the flame-retardant thermoplastic resin composition samples containing Hytrel, a polybutylene terephthalate/polytetramethylene glycol copolymer, as item (A) also had a further increased tensile elongation while maintaining the tensile strength and flame retardancy.

The flame-retardant thermoplastic resin composition samples containing an acidic phosphate compound as item (D) and Hytrel, a polybutylene terephthalate/polytetramethylene glycol copolymer, as item (A) prepared in Example 29 as shown in Table 5 had a further increased tensile elongation while maintaining the tensile strength and flame retardancy.

It is clearly seen from the results in Examples 30 to 39 given in Table 6 that the tensile properties and flame retardancy are further improved by adding an acidic phosphate compound of item (D), fluorine resin of item (G), and GF of item (G). In particular, the results in Examples 31 to 33 indicate that the tensile properties are largely improved by adding PC resin as item (A). Furthermore, the results in Examples 34 to 39 show that the mechanical properties and impact strength were improved by adding a phosphorus compound of item (E). The samples in Example 34 are found to be high in retention stability in particular. Comparison between Example 30 and Comparative example 11, between Example 32 and Comparative example 12, and between Example 36 and Comparative example 13 indicates that the addition of a compound of item (C) serves to largely decrease the corrosiveness to metals and also largely improve the retention stability. In the case of the samples containing pellets or a molded article of the flame-retardant thermoplastic resin composition subjected to copper plate corrosion test, the copper plate was not found to become aeruginous, and it was decided that the plate was free from corrosion. In the case of the samples containing pellets or a molded article of flame-retardant thermoplastic resin compositions consisting of components of items (A) and (B) but free from components of item (C) subjected to copper plate corrosion test, on the other hand, the entire surface of the copper plate become aeruginous, and it was decided that the plate was heavily corroded. Thus, it is inferred that pellets and molded articles of flame-retardant thermoplastic resin compositions produced from items (A), (B) and (C) according to an embodiment of the invention are not corrosive to metals when subjected to heat treatment as assumed for the invention performed at a heat treatment temperature of 270° C. for a heat treatment time of 3 hours.

According to exemplary aspects of the invention, flame-retardant thermoplastic resin compositions and molded articles with excellent characteristics particularly including largely reduced corrosiveness to metals can be produced from a mixture with a specific composition ratio of a thermoplastic resin, a phosphinic acid salt, and a compound of a specific structure, without using a halogen based flame retarder but with a high flame retardancy maintained. The flame-retardant thermoplastic resin composition and molded articles of the invention can serve in a wide range of fields such as mechanical machine parts, electric/electronic components, and automotive parts, and have extremely high industrial applicability.

The invention claimed is:

1. A flame-retardant thermoplastic resin composition comprising 65 to 99 wt % of (A) a thermoplastic resin; 1 to 35 wt % of (B) at least one phosphinic acid salt selected from the group of phosphinic acid salt, diphosphinic acid salt, polymer of phosphinic acid salts, and polymer of diphosphinic acid salts; and 0.001 to 0.70 wt % of (C) a compound having a structure as represented by Formula (1):

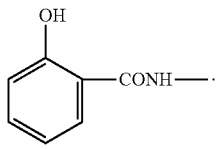

(1)

2. A flame-retardant thermoplastic resin composition as claimed in claim 1 wherein said item (A) is at least one selected from the group of polyester resin, polyamide resin, and polycarbonate resin.

3. A flame-retardant thermoplastic resin composition as claimed in claim 1 wherein said item (C) is a compound as represented by Formula (2):

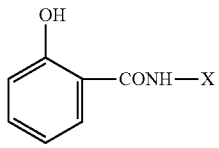

(2)

where X represents a heterocyclic group containing a nitrogen atom.

4. A flame-retardant thermoplastic resin composition as claimed in claim 1 wherein said item (C) is a compound as represented by Formula (3):

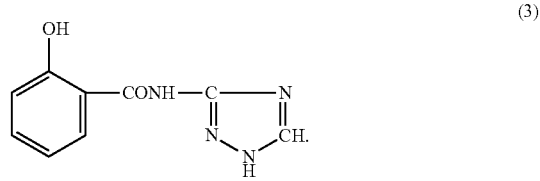

(3)

5. A flame-retardant thermoplastic resin composition as claimed in claim 1 that does not corrode metals when subjected to heat treatment at a heat treatment temperature of 270° C. for a heat treatment time of 3 hours.

6. A flame-retardant thermoplastic resin composition as claimed in claim 1 further containing 0.001 to 1.0 part by weight of (D) an acidic phosphate compound relative to 100 parts by weight of items (A), (B) and (C).

7. A flame-retardant thermoplastic resin composition as claimed in claim 1 further containing (E) one or more phosphorus compounds selected from the group of phosphate compound, phosphazene compound, and phosphaphenanthrene compound and/or (F) a nitrogen compound based flame retarder, wherein the total of said item (E) and said item (F) accounts for 1.0 to 25 parts by weight relative to 100 parts by weight accounted for by the total of said items (A), (B), and (C).

8. A molded article produced by molding a flame-retardant thermoplastic resin composition as claimed in claim 1.

\* \* \* \* \*